(12) United States Patent
Rahman et al.

(10) Patent No.: US 10,558,365 B2
(45) Date of Patent: Feb. 11, 2020

(54) PRECISELY TRACKING MEMORY USAGE IN MULTI-PROCESS COMPUTING ENVIRONMENT

(71) Applicant: Pivotal Software, Inc., San Francisco, CA (US)

(72) Inventors: Mohammad Foyzur Rahman, San Mateo, CA (US); George Constantin Caragea, San Mateo, CA (US); Carlos Garcia-Alvarado, San Jose, CA (US); Michail Petropoulos, San Francisco, CA (US)

(73) Assignee: Pivotal Software, Inc., San Francisco, CA (US)

( * ) Notice: Subject to any disclaimer, the term of this patent is extended or adjusted under 35 U.S.C. 154(b) by 0 days.

(21) Appl. No.: 16/049,468

(22) Filed: Jul. 30, 2018

(65) Prior Publication Data
US 2018/0335952 A1 Nov. 22, 2018

Related U.S. Application Data

(63) Continuation of application No. 14/740,204, filed on Jun. 15, 2015, now Pat. No. 10,037,144.
(Continued)

(51) Int. Cl.
*G06F 9/46* (2006.01)
*G06F 3/06* (2006.01)
(Continued)

(52) U.S. Cl.
CPC .......... *G06F 3/0608* (2013.01); *G06F 3/0631* (2013.01); *G06F 3/0653* (2013.01);
(Continued)

(58) Field of Classification Search
None
See application file for complete search history.

(56) References Cited

U.S. PATENT DOCUMENTS 7,694,085 B2 * 4/2010 Tiittanen ............. G06F 11/1658
709/217
8,832,063 B1 9/2014 Dean et al.
(Continued)

OTHER PUBLICATIONS

'Oracle® Database Reference,' [online]. "V$SQL_WORKAREA," 2003 retrieved on Aug. 10, 2015. Retrieved from the Internet: URL: http://docs.oracle.com/cd/B14117_0 1/server.101/b10755/dynviews_2109.htm, 2 pages.
(Continued)

*Primary Examiner* — Diem K Cao
(74) *Attorney, Agent, or Firm* — Fish & Richardson P.C.

(57) ABSTRACT

Methods, systems, and apparatus, including computer programs encoded on computer storage media, for precisely tracking memory usage in a multi-process computing environment. One of the methods includes implementing an instance of a memory usage tracker (MUT) in each process running in a node of a computer system. A MUT can maintain an account of memory usage for each of multiple logical owners running on a process on which the MUT is running. The MUT can determine an actual memory quota for each owner, and enforce the actual memory quota of the owner. Enforcing the actual memory quota of the owner can include receiving each memory allocation request, checking each allocation request and a current state of the account against the actual quota, approving or rejecting each allocation request, communicating the approval or rejection to an underlying memory manager, and updating the owner account for each approved allocation request.

18 Claims, 9 Drawing Sheets

Related U.S. Application Data

(60) Provisional application No. 62/012,256, filed on Jun. 13, 2014.

(51) Int. Cl.
  *G06F 16/2452* (2019.01)
  *G06F 9/50* (2006.01)
  *G06F 9/48* (2006.01)

(52) U.S. Cl.
  CPC .......... *G06F 3/0659* (2013.01); *G06F 3/0673* (2013.01); *G06F 9/4881* (2013.01); *G06F 9/5011* (2013.01); *G06F 9/5016* (2013.01); *G06F 16/24524* (2019.01)

(56) References Cited

U.S. PATENT DOCUMENTS

| | | | |
|---|---|---|---|
| 8,626,993 | B2 | 10/2014 | Vaishampayan et al. |
| 10,037,144 | B2 | 7/2018 | Rahman et al. |
| 2004/0230763 | A1 | 11/2004 | Cohen et al. |
| 2005/0193023 | A1 | 9/2005 | Ismail |
| 2010/0161909 | A1 | 6/2010 | Nation et al. |
| 2012/0072686 | A1* | 3/2012 | Iyengar ............ G06F 12/02 711/162 |
| 2014/0137131 | A1 | 5/2014 | Dheap et al. |
| 2014/0304251 | A1 | 10/2014 | Bornea et al. |
| 2015/0081978 | A1 | 3/2015 | Daly et al. |

OTHER PUBLICATIONS

'Oracle® Help Center' [online]. "14 Memory Architecture," 2015, retrieved on Aug. 10, 2015. Retrieved from the Internet: URL: http://docs.oracle.com/cd/E11882_01/server.112/e40540/memory.htm#CNCPT007, 31 pages.

'PostgreSQL,' [online]. "41.3. Memory Management," 2015, retrieved on Aug. 10, 2015 http://www.postgresql.org/docs/8.2/static/spi-memory.html, 2 pages.

Dageville and Zait, "SQL Memory Management in Oracle9i," Proceedings 28$^{th}$ VLDB Conference, 2002: http://www.vldb.org/conf/2002/S29P03.pdf.

Hüdsön and MäcWhërtër," PostgreSQL. Mission: Retrofit Memory Manager," Proceedings 30$^{th}$ VLDB Conference, 2004, 7 pages http://www.cs.cmu.edu/~bhudson/projects/dbase/final.pdf.

International Preliminary Report on Patentability in International Application No. PCT/US2015/035614, dated Dec. 15, 2016, 11 pages.

International Search Report and Written Opinion in International Application No. PCT/US2015/035614, dated Dec. 21, 2015, 16 pages.

Invitation to Pay Additional Fees and, Where Applicable, Protest Fees in International Application No. PCT/US2015/035614, mailed Oct. 7, 2015, 8 pages.

European Office Action issued in European Application No. 15731464.2, dated Nov. 19, 2018, 6 pages.

* cited by examiner

US 10,558,365 B2

PRECISELY TRACKING MEMORY USAGE IN MULTI-PROCESS COMPUTING ENVIRONMENT

CROSS-REFERENCE TO RELATED APPLICATIONS

This application is a continuation of U.S. application Ser. No. 14/740,204, filed on Jun. 15, 2015, which claims priority under 35 U.S.C. § 119 (e) (1) to U.S. Provisional Application No. 62/012,256, filed on Jun. 13, 2014. The disclosures of the prior applications are considered part of and are incorporated by reference in the disclosure of this application.

TECHNICAL FIELD

This specification relates generally to memory management.

BACKGROUND

Memory is a critical system resource that determines database performance and stability to a large extent. In this specification, the term "memory," unless modified, refers to random access memory. In the absence of enough memory, queries can slow down because of spilling or simply error out, resulting in undesirable behavior. As memory is unlimited, proper memory management is the key to ensure fair and acceptable usage, and the best possible user experience.

In a massively parallel processing (MPP) database, the following high level steps describe query processing:
1. User submits a query.
2. Parser parses the query.
3. Planner plans the query and produces a query plan tree, consisting of different processes; processes may occur multiple times in the tree.
4. A memory quota process assigns each operator a certain memory quota that defines the maximum memory the operator can use, to limit its runtime memory allocation.
5. The plan is dispatched to multiple worker nodes to execute in a distributed manner.
6. Each worker node receives its copy of the plan tree which indicates the memory quotas assigned to the processes.
7. A query execution engine executes the plan.
8. A result is returned back to the user, through the server.

Throughout this process, memory is allocated by multiple queries. To ensure fair usage and proper utilization of memory as well as to ensure system stability, the system must do the following:
1. Measure memory usage of each query.
2. Check to see if the memory usage is within the quota.
3. Enforce the memory quota for different queries.

Every major database has a memory manager to efficiently allocate and free memory. Moreover, major databases have algorithms to assign memory quota to SQL (structured query language) statements during the planning of a query. During execution, memory managers commonly use memory regions to allocate memory to SQL operators, mostly for efficiency and for tracking allocations.

SUMMARY

This specification describes technologies for tracking memory usage in a computing environment. These technologies generally involve implementing an instance of a memory usage tracker (MUT) in each of a plurality of processes running in a node of a computer system. Each MUT maintains an account of memory usage for each of a plurality of owners running on the respective process associated with the MUT. Each owner is a logical owner of a collection of one or more regions of code associated with a common functionality. The MUT can determine an actual memory quota for each of the owners. The MUT enforces the actual memory quota of each owner by receiving an allocation request for memory made by each owner, checking each allocation request and a current state of the account for the owner against the actual quota of the owner, approving or rejecting each allocation request and communicating the approval or rejection to an underlying memory manager, and updating the account of the owner for each approved allocation request.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

1.1 Memory Manager System

Figure 1A:
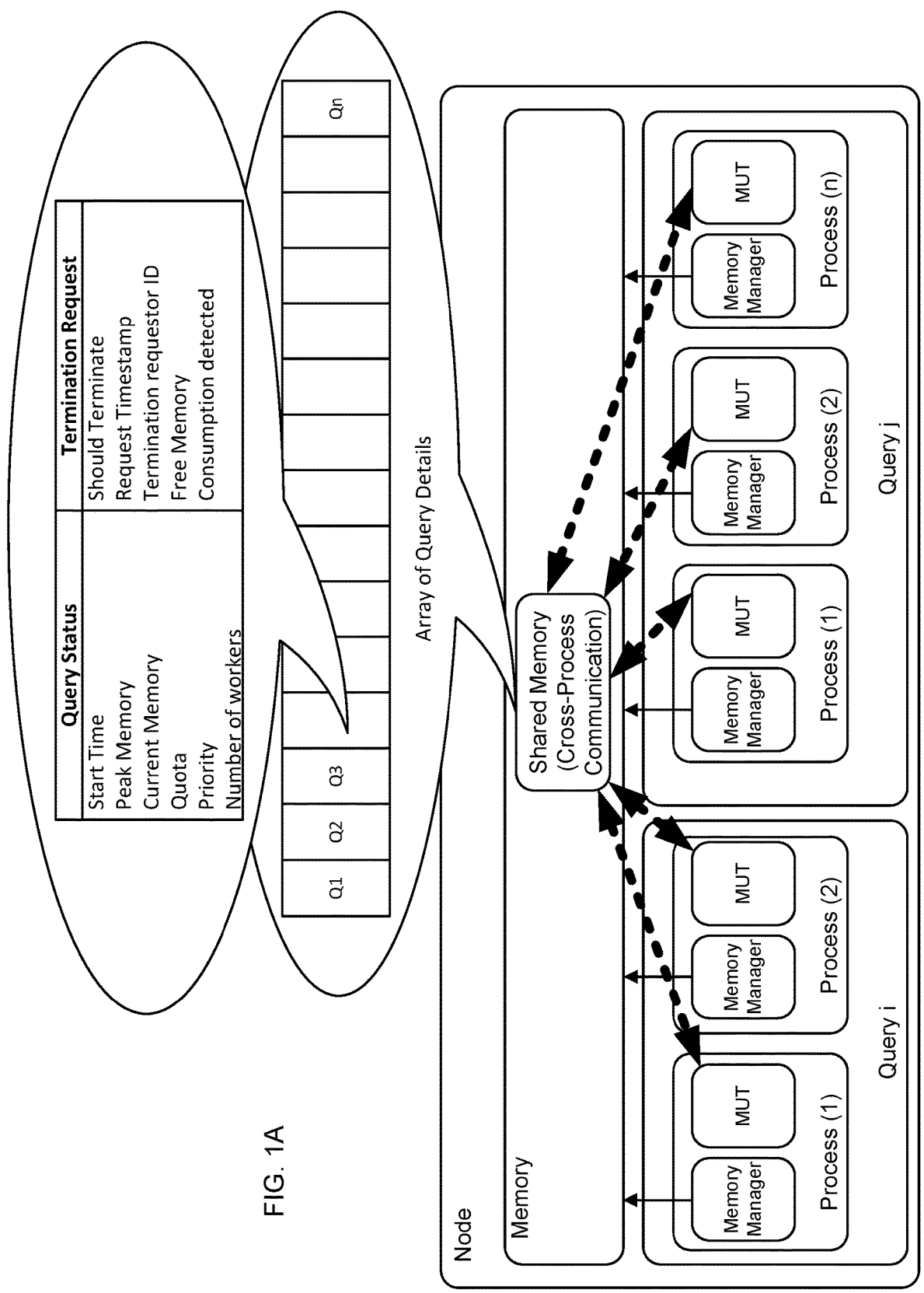
FIG. 1A is a diagram of an example system for tracking memory usage.

The usability of any memory manager lies on the precision of measuring memory usage of each query. If the measurement is wrong or imprecise, it may not be possible to ensure fair memory usage or to ensure system stability. This specification describes a memory manager system that can track precise memory usage of different queries and provides these functionalities. The memory manager system can ensure fair memory usage and proper memory utilization and most importantly it can improve system stability.

Because the memory manager system provides precise tracking of memory usage by different components, it does not need to make these three common assumptions:
1. There is a known set of memory-intensive queries.
2. Tracking memory usage of memory-intensive queries is good enough to ensure fair usage and proper memory utilization.
3. Memory-intensive queries allocate in a set of exclusive memory regions and there is an one-to-one mapping of memory regions and memory intensive operators.

The memory manager system will be described in an example implementation in a database management system (DBMS). The DMBS is implements parallel processing and may be an MPP database. The database operates on multiple physical computer nodes. In some implementations, on each node one or more segments, i.e., segment instances, are instantiated. Each segment is a logical node, and may be thought of as a virtual machine. Each segment will generally be running many processes; each process is an individual executable unit. Each process has its own memory quota and its own instance of the memory manager system. The memory manager system of a particular process has some ability to interact with the memory manager systems of other processes on the node, as will be described later. The DBMS breaks complex queries into small tasks and distributes them for execution. The nodes work together to form a single parallel query processing system.

The memory manager system can monitor usage, enforce quota, which ensures fairness, and adapt based on system load, which ensures proper memory utilization. The memory manager system has the following features:

1. It tracks the precise memory usage of different queries.
2. It provides an extensible framework to flexibly define which queries to track; using the framework, any number of SQL processes can be tracked, as well as non-process components.
3. It can measure memory usage at arbitrary code regions based on allocation site (such as the file or function of the code region). Such arbitrary code regions are called memory owning code types or simply owner types. Instances using a code region are called memory owning code or simply owners.
4. Memory owner types, which are sections of code, can each be assigned one of any number of different roles, e.g., table scan, sort or aggregate, which correspond to SQL processes, or even roles that correspond to non-SQL process components, e.g., the query planner.
5. The memory manager system can gather allocations from different memory regions per-owner and can differentiate allocations of different owners within a single memory region. In the context of tracking allocations as memory accounts, references to owner allocations and owner accounts should always be understood to be reference to allocations and accounts of owners.
6. The memory manager system can track lost utilization.
7. The memory manager system can detect low system memory and suspend or terminate one or more queries to ensure system stability.

The memory manager system tracks allocation ownership, i.e., which code instance is responsible for a memory allocation, based on the allocation site, i.e., the site in the code where a memory allocation request is made. Each allocation site is associated with information identifying an owner type, which may be a catch-all in the absence of a specific assignment of ownership. Moreover, the memory manager system framework supports polymorphic allocation sites, so that allocations made from a shared library can assume multiple ownership, based on the allocating shared-library process, the owner of the call to the library, and where in a query plan tree the process is executing. This allows precise ownership tracking to be achieved.

1.2 Owners and Memory Accounts

Owner types of memory are defined based on a logical partitioning of a code base, e.g., the code base of an MPP DBMS. Regions of code that are relevant to a database process, e.g., a SQL process, or to a parser, planner, optimizer, dispatcher, query serializer and deserializer, executor or other operators, or other non-process components as desired, can be identified as distinct owner types. After a partitioning has been decided upon, it can be implemented in a number of ways, as long as the net effect is that the memory manager system can determine, for each allocation of memory, which instance of a partition, i.e., which owner, should account for the allocation. For example, the code can be instrumented with calls to a memory manager system API that informs that memory manager system which owner code is being executed at any time. Alternatively, the memory manager system can include a gateway through which calls to processes that correspond to owners, e.g., database processes, are made, and the gateway can provide or maintain the information needed to switch ownership. The memory manager system can then record memory usage of owners in corresponding memory accounts, which are counters that record memory usage of owners. Each of the owners can further separate its memory usage from the memory usage of the underlying subsystems such as storage, interconnect, catalog access and so on by using sub-memory accounts.

An owner has an owner type. An owner has exactly one owner type, which corresponds to the region of code associated with the owner type's process or non-process component. Each owner, i.e., instance of that owner type, has one memory account that would be used to record the allocation of memory by that instance of code (owner type), or by code called by the owner type's code region, as will be described below.

1.3 Sub-Memory Accounts

Sub-memory accounts are finer sub-division of memory consumption of an owner. A process, e.g., a sort process, may depend on a complex subsystem such as a data provider, network transportation layer, a sub-plan, or a user function, whose memory usage the process is not directly responsible for. The memory manager system can track such sub-accounts and at the same time can ensure that the aggregate of all sub-accounts and the owner account still stays within the defined memory quota. This provides a precise separation of memory usage on top of a precise per-owner memory usage.

1.4 Short-living and Long-living Memory Accounts

The memory manager system also provides support for account lifespan, to detect different phases of execution. Some accounts may be tagged as living beyond a single execution phase, called long-living memory accounts, while others may be tagged as living for one execution phase. Execution phase is an abstract time concept which can be used to verify memory leaks and to check for long-living allocations. For a query execution, the long-living accounts may live for the entire query or multiple queries, while the short-living accounts may live only for a single SQL process.

1.5 Memory Manager System Components

Memory Manager (MM)

The memory manager (MM) is in charge of executing allocation requests and deallocation requests. In some implementations, the MM is a region-based memory manager. Each process may be associated with an instance of the MM. For a region-based MM, the MM allocates memory in chunks; a chunk is a single allocation of memory. Each chunk belongs to a particular memory region. For example, as shown at FIG. 1, the memory manager can manage regions of memory, shows as the rows of boxes, that each comprise chunks of memory, represented by the individual boxes in each row.

Memory Usage Tracker (MUT)

The memory usage tracker (MUT) is responsible to record allocations in the memory account of the current owner, i.e., the current instance of an owner type. It is also responsible for recording deallocations in the owner account that initially allocated the deallocated memory. Note that deallocations of one owner's memory can happen when a different owner is active. The MUT interacts with the MM to identify allocation and deallocation activities. The MUT also provides application program interfaces (APIs) that process code or non-process code can call to create memory accounts. The MUT maintains newly creates memory accounts in a memory accounting tree. It also has APIs to activate and deactivate an account. When an account is active, its owner is the active allocator, which means that any new memory allocations are counted against that owner and that owner's memory account, as long as it is active. Besides providing basic account creation, switching, and usage tracking APIs, the MUT also has various reporting APIs to report memory usage.

The MUT can additionally monitor the system's available memory to check if the system is low in memory. If the system reaches a critical low memory condition or an out-of-memory (OOM) event, the MUT can suspend or terminate queries based on predefined policies. The MUT can also identify and record queries that consume excessive memory to help diagnose memory problems. In particular, the MUT may save a snapshot of the current memory consumption of the current process and notify the MUTs in other processes about this OOM event. The MUT also tracks OOM events in other running processes by periodically checking if any new OOM event happened in other processes. If it detects any such out-of-process OOM, it also logs the memory usage of the current process so that we get a holistic picture of memory consumption across all the processes in the system.

The MUTs also use shared memory in the system memory to centrally monitor memory usage across all queries (and thus, all database processes) running on the node. The MUTs can use the shared memory to determine, during a low memory event or OOM event, which particular query or queries should be terminated, and can update information in the shared memory to instruct the particular query or queries to terminate.

1.6 Interaction of Memory Manager System Components in Allocation of Memory

The memory manager system performs the following sequence to enable proper memory monitoring in an allocation of memory.

1. Creation of an account by an owner: If an owner's code region starts executing, it will first request the MUT to create an appropriate memory account, if a suitable one does not exist already. For example, if the process Sort is executing, Sort would ask the MUT to create a memory account for the Sort process, if a suitable one does not exist already. The MUT will create the memory account in the memory accounting tree, and return it back to Sort.

Similar to the Sort operator, other owners can also create their corresponding memory accounts that can represent the owner's identity and save memory usage information. After the owner's memory account has been created, the owner gets back an ownership token which is just a pointer to its memory account. The owner can then use this token to set its memory account as active when required, which instructs the MUT to record memory allocations in that account.

2. Memory account switching or activation of a memory account: Once the memory account is created, Sort, for example, would request the MUT to set it as the active owner whenever it is executing. The MUT would then set the Sort memory account as the active memory account.

3. Request new memory: If necessary, Sort can request new memory from the MUT.

4. Allocate memory: The MUT interacts with the MM to allocate new memory from the system.

During this process, if the MUT detects a low system memory level, the MUT identifies queries with high memory consumption. The MUT may also notify peer MUTs in other processes about this low memory condition. A direct notification mechanism from one MUT to others enables all the MUTs to act quickly to alleviate low memory conditions. The MUT may interact with its peer MUTs using the shared memory described previously. Upon notification, each of the MUTs can decide to suspend or terminate their respective process based on a predefined policy to free up memory, based on receiving instructions to terminate their respective processes, based on accessing data at the shared memory indicating that the MUTs should terminate their respective processes, or by another method.

5. Updating the memory account: If the allocation is successful, the MUT records the allocation in the currently active memory account. If a sub-component is responsible for an allocation, the allocation is recorded in the corresponding sub-account and in the active owner's memory account. During this process, the MUT can detect a quota violation and in that case can decline the allocation request. Moreover, the MUT can arbitrate memory between multiple owners to redistribute unused quota of one owner to another. The MUT can also talk to a MUT of another process or the MUTs of other processes to arbitrate cross-process memory redistribution.

When system memory is allocated by chunk, each chunk associates itself to no more than one memory account, as determined by the active memory account during the allocation of that chunk. The allocated chunk includes a header that includes information enabling identification of the owner and memory account associated with that chunk as will be described later.

1.7 Interaction of Memory Manager System Components in Deallocation of Memory

The memory manager system can deallocate memory in several ways, enumerated below:

1. Explicit deallocation request from an owner: If an owner requests deallocation of a memory chunk the MUT is notified about the deallocation. The MUT identifies the original owner who allocated the chunk from a header in the chunk, and locates the corresponding memory account. It then adjusts the account balance of the original owner to reflect the deallocation, e.g., by deducting an amount of memory equal to the chunk from the original owner's account balance.

2. Bulk freeing based on deceased or reset context: The memory manager system provides a bulk free operation on a memory region to free all the allocations in that region. The MUT provides an API to handle the bulk free operation. If a decision is made to bulk free a memory context, the MUT identifies all the memory accounts that allocated memory in that region, and adjusts their balances according to their aggregate allocations for that region.

3. Deceased memory accounts: The MUT also supports a reset or wiping off of the memory accounting tree, after which only the long-living accounts will survive. Any chunk that has a short-living owner will be owned by a rollover account, which is a long-living account whose purpose is to track long-living allocations. The sub-accounts of the rollover account assume the ownership of the allocations in the corresponding sub-accounts in the short-living accounts. As a result, all the chunks will have the same rollover owner irrespective of their prior owners. Besides tracking legitimate long-living allocations, the rollover account can be used to help diagnose unexpected long-living allocations or memory leaks.

1.8 Novel Features

The memory manager system has the following novel features:

1. Tracking Usage Per Owner

The memory manager system defines memory allocations in terms of flexibly defined owners. Any owner can allocate memory in multiple memory regions, and the memory manager system automatically tracks the aggregate memory footprint of an owner across all allocations. Therefore, the system can easily handle memory allocations in which one owner's allocations span multiple code regions and one code region can contain allocations attributable to multiple owners.

2. Flexible Ownership Framework

The memory manager system works on a flexibly defined set of owner types. An owner type can be a well-defined process, a module, a sub-module or even one or more arbitrary code regions. A code region can be annotated with multiple different owner types, and any allocation of memory in that code region is automatically considered as being used by an owner of that owner type according to the annotation. Such flexibility allows the memory manager system to measure precise memory consumption by different processes.

3. Polymorphic Ownership Framework

Each code region can assume multiple ownership roles based on the logical role at the time of execution. Therefore, common data structures such as APIs and shared components can assume different ownership roles at runtime.

The above three novel features eliminate limitations of region based memory usage tracking for memory-intensive processes.

4. Hierarchical Provenance Management

SQL query plans are inherently tree-like. Utilizing the tree-like shape of SQL plans, the memory manager system keeps track of all the owners in a tree. This allows logical provenance separation for different owners of the same owner type. For example, if two Sort processes are found in the same SQL plan, the memory manager system can differentiate between them by using the plan structure tree. Moreover, for non-process components such as Planner, a query plan generator, or Parser, an SQL parser, the memory manager system provides a tree-like representation based on execution path and call stack.

5. MPP Database Support

The flexibility that results from implementing an annotated code region based ownership model allows the memory manager system to support not only memory intensive SQL processes such as Hash Join but also non-process components such as a query plan serializer and deserializer and a query planner. That is, the memory manager system can—

1. Track memory consumption of non-process owners: in an MPP database platform, non-process components can consume as much or in some cases more memory than the memory intensive processes. For example, the query planner working on relations with large number of partitions can consume a significant amount of memory. Similarly, a large plan may introduce significant memory overhead at runtime while dispatching to multiple nodes in an MPP database.

2. Track memory consumption of processes that are traditionally considered non-memory intensive: Simple Scan processes, which are traditionally considered non-memory intensive, may become memory intensive because of a new storage type, e.g., the parquet operator in HAWQ.

3. Track memory consumption of sub-systems: An MPP database may have many processes other than standard SQL processes. For example, an MPP database may introduce significant memory overhead during query dispatching at the network layer. The memory manager system is aware of such allocations so it can ensure system stability and proper memory utilization.

6. Local and Global Arbitration of Memory Allocations

In an MPP database the workload can be diverse and complex. The memory manager system supports local arbitration to reallocate memory from one process to another to adapt at the process level for different workloads. Moreover, the memory manager also supports a global arbitration mechanism to utilize idle memory quota from a peer query.

7. Integrated Support for Diagnosing Memory Problems

The memory manager system supports detection of quota violations by different owners: This allows the memory manager system to regulate the memory consumption of different owners, including SQL process instances.

The memory manager system automatically tracks long-living memory allocations and supports the detection of memory leaks: The memory manager system supports identification of a query that leaks memory.

In the event of low system memory, the memory manager system can identify the memory owner and the query that is consuming large amounts of memory.

The memory manager system supports suspension and termination of queries with large memory footprints if an urgent workload requires that this be done.

8. Optimizations to Support Real-Time Database Engines

The memory manager system automatically tracks a history of allocations and shares the metadata across multiple allocations by the same owner to minimize memory overhead.

Tracking memory usage by owners requires frequent updates of the owners' memory usage counters. The memory manager system minimizes the overhead by coalescing subsequent updates to minimize the number of update operations.

Memory allocations may often survive multiple SQL processes. The owners of later SQL processes are only consumers of such long-living allocations and therefore are not responsible for their allocations. The memory manager system, however, takes such allocations into account to track memory availability. The memory manager system provides a fast ownership switching of long-living allocations to the memory manager system to keep track of such allocations.

2. Nomenclature
2.1 Common Nomenclature

| Term | Description and Meaning | Comments |
| --- | --- | --- |
| Memory manager | A generic region based memory manager is assumed to be present. A region based memory manager allocates memory in regions. Region can be thought of containers that can be freed in bulk. I.e., when a container/region is freed, all the memory allocations at the scope of that container are freed together. | |
| Memory chunks (or chunks for short) | The unit of memory allocation in the DMBS is the chunk. Whenever memory is requested from the memory manager, it allocates a chunk of memory of the requested size to serve that request. | |
| Operator | Generally, the executable code or a code instance that implements a SQL operation. | SQL Plans can have many plan nodes with different operators |
| Logical owners | A logical owner is a collection of non-contiguous code regions including libraries and shared code associated with a common functionality. For implementing its functionalities a logical owner may allocate multiple memory blocks. A logical owner can allocate memory across multiple memory regions, based on the lifespan requirements of the allocations. Moreover, a single region can contain allocations from multiple logical owners. Owners can be different SQL operators, such as: Scan of a table Sorting Join Aggregation Owners can also be non-SQL-operators such as: Parser Planner SQL plan serializer and deserializer | For example, a SQL Sort operator owns the memory that it allocates for sorting. However, it may not own the memory that another operator allocates. |
| Owners | At runtime there can be multiple instances of a logical owner allocating memory for executing a SQL plan. Each of these instances is the owner of its memory allocations. | A SQL sort operator may have multiple instances in the SQL plan. While the logical ownership is still pertinent to sorting operation, different instances of this collection of code regions (the logical owner for sorting) may have different execution paths, based on input data and various parameters. Therefore, each owner may end up allocating different amount of memory at different locations of its code regions. |
| Quota | Quota is the maximum amount of memory an owner is allowed to allocate. | |
| Actual Quota | A quota that is used by the memory usage tracker when evaluating whether an owner is violating its quota. This quota may be an initial quota that was assigned to the owner that has been adjusted. | |
| MPP Node (or node for short) | An MPP database can dispatch query to multiple MPP nodes to execute the query in a parallel manner. Each node resides on a physical machine. A physical machine can host multiple nodes, or just one node. | |

-continued

| Term | Description and Meaning | Comments |
|---|---|---|
| Query memory | In an MPP database a query is executed using multiple worker processes. The combined memory usage of all the workers is the query memory. | |
| Global-memory quota | The maximum amount of memory that can be allocated by all DBMS processes running on node. | |
| Global-memory usage | A counter that tracks the combined allocations of all the DBMS processes on a node. | Global memory usage can identify low memory conditions (i.e., allocated memory is approaching global memory limit). |
| Out-of-Memory (OOM) event | Request for new memory block can generate an OOM event for one of two reasons: (1) the global-memory limit has been reached or (2) the host level memory is exhausted. | OOM event needs to be avoided to ensure system stability. Support for proper diagnosis needs to be provided in the event of an OOM. |
| Low memory condition (LOC) | If the global memory usage approaches the global quota, a low memory condition is triggered. | Detecting LOC before an OOM happens would allow proactive measures to restore system stability. |
| Memory Usage Tracker (MUT) | The proposed framework that provides memory usage tracking for different owners. | The memory manager notifies MUT about allocations/deallocations of memory. Application developers annotate code regions with different logical owner information. At runtime MUT can track memory consumptions per-owner (i.e., instance of logical owners). MUT has a host of other features that enables it to track memory consumption across all owners as well as across all processes. It can detect OOM and LOC and act to restore system stability and to help diagnosing OOM. |

3. Owner Process Overview
3.1 Non-Process Component Operators

| Logical owners | Description | Data Kept in Corresponding Node of Same Name in Memory Accounting Tree |
|---|---|---|
| Parser | Converts a SQL query into an abstract syntax tree | The memory statistics of the parser |
| Planner | Converts an abstract syntax tree into a query execution plan | Memory statistics of the planner |
| Dispatcher | Sends the query plan to all nodes | Memory statistics of the QD |
| Serializer | Serializer used by QDs to serialize a plan to send it to processes | Memory statistics of the serializer |
| Deserializer | Deserializer used by processes to deserialize a plan before executing it | Memory statistics of memory use during deserialization; can identify the impact of large decompressed queries |
| Executor | Query executor | Memory statistics of the main executor, under which other operators operate |
| Others | There can be many other logical owners, depending on the implementation. Some of them include: Catch-all logical owner for the main executable Network communication layer Database writer process Logging framework etc. | Flexible definition of logical ownership enables precise measurement of memory usage across different parts of code regions. |

3.2 MUT Components

| Name | Description | Comments |
| --- | --- | --- |
| Memory account (or account for short) | A data structure to record owner's memory usage. | The memory manager records memory usage details using this structure. Each owner will have one memory account to record its usage. |
| Sub-account (sub-memory-account) | Each memory account can have multiple sub-accounts to partition usage at a finer granularity. | For example, a table scan may rely on a storage layer to read the tuples. With a storage sub-account, the storage layer's memory overhead can be separated from that of table scan or other operators. |
| Tree of memory accounts | Memory accounts are maintained in a tree form to identify hierarchy, e.g., an operator may come under the main executor memory accounts. | Tree walking gives the memory manager a picture of the hierarchy of ownership. The tree of memory accounts is modeled after the SQL plan where different operator instances (e.g., Sort operator appearing multiple times) can be distinguished using the tree location of the owner's account. Moreover, for owners that are not SQL operators the tree gives a sense of owners' execution context in terms of the execution of the SQL plan. |
| Generation of memory accounting tree (or generation for short) | The lifespan of a program can be partitioned across multiple generations, using a logical execution model. E.g., in DBMS if we process multiple queries, each query defines a new generation. Memory allocated for one particular query can be tracked in one tree of memory accounts. If another query comes in, MUT can create a new memory accounting tree to track memory usage of the new query. Therefore each memory accounting tree has an associated generation that tracks all the allocations made during that lifespan. Generation is identified using a counter that advances every time we submit a new query (i.e., start a new logical execution). It is also possible to define a generation across multiple queries, using per-transaction or any other lifespan event. | |
| Generation advancement | Each database query may start a new generation, advancing the generation counter. When generation is advanced, the existing memory accounting tree is destroyed, and a new memory accounting tree is created. Any outstanding allocations that are owned by memory accounts from the destroyed memory accounting tree are tracked using a special account. | When a generation advances, any outstanding allocations are considered from old generation and are candidate for memory leak detection. It is also possible to analyze how old the outstanding allocations are based on what generations they were originally allocated. |
| Chunk header | Each chunk has a small header that can be used by the MUT to identify that chunk's ownership information. | MUT can record the ownership information in the chunk's header during allocation. During deallocation, MUT can use the header to identify the owner, and reduce the owner's memory usage by the size of the chunk. |
| Shared chunk header | For minimizing memory overhead, MUT does not save all ownership information in the chunk header. Instead, MUT allocates shared chunk header with the ownership information and tries to reuse the same shared chunk header (hence the name "shared") across multiple | |

-continued

| Name | Description | Comments |
| --- | --- | --- |
| | chunks. Each chunk header points to a shared chunk header. | |
| Long-living accounts | Any account that lives beyond a generation, is called a long-living account. | Long-living accounts can track allocations that live beyond a generation. They can also track the memory overhead of MUT. |
| Short-living accounts | Most of the accounts in the memory account tree live for a single generation and are deleted at the end of that generation. These are the short-living accounts. | Short-living accounts ensure proper separation across generations. They also ensure timely release of memory held my memory accounting tree that may no longer be relevant. |
| Chunk generation | Each chunk is tagged or otherwise associated with the generation of the owning account using the shared header of the chunk. | Chunk generation allows the memory manager to track long living chunks. |

3.3 Special Memory Accounts

| Name | Description | Comments |
| --- | --- | --- |
| Logical root | The root of the memory accounting tree. All other memory accounts are descendants of this account. | |
| Allocation overhead account | This account keeps track of the memory overhead of the shared chunk headers. | Part of the MUT memory overhead comes from allocating shared chunk headers. This account tracks such overhead. |
| Owner overhead account | This account records the memory overhead for allocating memory accounts and memory accounting tree. | Using this account along with allocation overhead account MUT can precisely record all of its own consumption, in addition to recording consumptions of owners. |
| Rollover | This is an account that assumes ownership of all previously allocated memory whose owners are no longer alive. | As the generation advances, this account assumes ownership of all allocations from earlier generations. MUT uses this account to track leaks and long-living allocations. |
| Top | This is a catch-all account for allocations that occur when no owner is active. | Catch-all account makes sure that no allocation goes unaccounted. |
| Active memory account | The active memory account is the account of the logical owner that is currently claiming to be allocating memory. Any new allocations are counted against active memory account. | Owners establish their memory ownership through the active memory account. For example, if a hash join operator is allocating memory, it can set the active memory account to its memory account, and it will be the owner of all new memory allocations unless its account is deactivated or another account is activated. |

3.4 Design Overview
Identifying Owners:

Memory is allocated in hierarchical memory regions. Each region has a lifespan, which controls how long the allocated memory will live. The required lifespans of memory regions can vary widely depending on the owning components and the intended use of the memory. For example, an Aggregate owner may maintain three different sets of memory regions depending on whether it uses a memory region for very short time, e.g., per tuple, or for long duration, e.g., per bucket of aggregation. Moreover, several different components may allocate memory from the same region. So, the memory owners and memory regions interweave each other. This necessitates logical partitioning of memory regions by owners that overlays current memory regions and that can span multiple regions to correctly record usage by each owner.

The owners of the memory are defined based on logical partitioning of memory consumers. Segments of code that are relevant to Parser, Planner, Optimizer, Dispatcher, Query Serializer and Deserializer, Executor and various processes are identified by programmers instrumenting the source code of the respective components or by use of a gateway that implements a mapping of process to owner, as described elsewhere in this specification, or by any other convenient technique for specifying an association of code to owner. Memory usage by these owners can then be recorded in their corresponding memory accounts. The memory usage of the owners can further be separated from the memory usage of the underlying subsystems, e.g., Storage, Interconnect, and so on, using sub-memory accounts.

Tracking Current Owners:

Once the developers of the code base have determined what the master and sub-account owners will be, the developers can annotate different code regions with their associated ownership information. The memory manager system provides a simple API, which the memory users, i.e., components that allocate memory, can call to designate their ownership. For example, a Parser before parsing the query can call the appropriate API to tell the memory manager system that the parsing code is beginning. At the end of the parsing process, it will call another function to let the memory manager system know that parsing ownership has ended. In between these two calls, the MUT will record all the memory allocation and deallocation under the parser's memory account. Note, it is possible that during parsing another owner starts allocating memory. Changing ownership is supported using both hierarchical memory accounting, e.g., various owners under the plan tree, as well as interweaved ownership, e.g., during a nested loop Join two different children operators might be accessing memory and switching ownership repeatedly.

Tracking Sub-accounts:

Memory accounting is also supported at sub-account level. If an executor node relies on storage to read tuples, or on interconnect to send tuples, it can decide to separately account those subsystems' consumption. To do this correctly, subsystem memory operations need to be designated separately. One way to do this is to call memory accounting APIs to switch to appropriate subsystem account at every subsystem call. However, such switching is expensive to implement as well as to maintain. Therefore, an automatic switching approach is preferred.

The solution to automatically switch to appropriate sub-accounts is a combination of macros and file based sub-account designation. Each file is tagged with its logical owner: e.g., storage related file, or interconnect related files, and so on. Each code region can assume multiple ownership roles based on the logical role at the time of execution. Therefore, common data structures such as APIs and shared components can assume different ownership roles at runtime.

Tracking Memory Usage:

As the owners allocate memory, the MUT automatically detects the proper owner using the active memory account and updates the balance of that owner's account or sub-account to reflect the new allocation. For deallocation, the MUT identifies the chunk's owner from the chunk header and updates that owner's balance to reflect the deallocation. Note that ownership identification is different for allocation than deallocation. While the active memory account or one of its sub-account assumes the charge for all new allocation, during deallocation it is credited to the original allocator, irrespective of the currently active memory account. During allocation and deallocation recording, the MUT also takes care of recording global-memory quota and the global-memory usage.

Tracking Violation:

Each memory account, including the active memory account, will have a memory quota based on the quota of the owner. A query's memory quota can be set by a developer or an administrator. An operator quota assignment algorithm distributes the query quota across its operator. Using the operator quota information, an allocation recording component of the MUT detects any quota violation when the memory manager notifies MUT about an allocation request.

To detect such violation, MUT would first identify the proper owner and its account using the process described above. The MUT would then compare the total allocations by that owner against the quota of that owner to detect violation. Upon detection of a violation, the MUT will first try to deallocate memory to get back within the memory quota by calling an arbitration function of the MUT associated with the particular owner. MUT can use its default arbitration function to redistribute quota across all owners, or individual owners can provide a custom callback to implement their quota reduction process. If the arbitration function can free enough memory to get back within the quota, the MUT ignores the violation. Otherwise, the MUT would fail the new allocation request.

Enforcement of Explicit Free Operation:

The region based memory manager provides a convenient bulk free of an entire region (i.e., all allocations within that region are freed at once). However, for some memory regions, such as regions where we frequently allocate large amount of memory, an explicit free operation on the allocations ensures timely release of memory. MUT can provide APIs to tag such memory regions that needs explicit free operation on each allocation. Once tagged, MUT can disable rollover mechanism on the allocations of such memory regions. Any allocations that are not explicitly freed, can be then blamed to the owner who allocated it to assist in diagnosing memory leaks per-owner.

Component Design: Ownership Tracker

Code regions that have memory operations including allocation, deallocation or usage, can be partitioned to different logical owners. Moreover, a single code region can belong to multiple logical owners. For example, sort API can be used from Sort operator, Sort-Merge-Join operator or Group-Aggregate operator. Depending on the owning operator, allocations done by the sort API may assume different ownership.

During execution, we may also have multiple instantiation of a logical owner. For example, Sort operator can appear in several different places in a plan tree. Each of these instances of the Sort operator has different ownership, i.e., different instances are associated with different owners of the same logical owner type. Thus, precise ownership can be assigned to code segments that can appear several times but operate as separate entities. Different owners of same type can be distinguished based on their positions in the plan tree. This can be accomplished, for example, by saving memory account pointers in their respective operator state. The MUT can walk the plan tree to differentiate different memory accounts based on their relevant plan operator.

In one implementation, a fixed set of sub-accounts is maintained in a fixed size array under the master account for fast access. This is appropriate when the set of useful sub-accounts can be defined for the whole DBMS, for example. A flexible hash based implementation to maintain an arbitrary set of sub-accounts is also possible.

For deciding which code regions constitute a particular owner, the developer may seek a simple set of files., e.g., owner X constitute files {Fi, Fj, Fk}. Although ownership based on a set of files may work for a well-designed system, the API based owner switching can go beyond that to define a logical owner with arbitrary code regions. Moreover, as discussed before, polymorphic sub-account determination can decide proper sub-accounts at runtime.

Each owner will be linked to its ownership structure (i.e., memory account), e.g., by a pointer. Use of a pointer ensures fast switching of ownership without any lookup delay, e.g., in a hash table. The actual allocation of ownership structure can be located in a dedicated region to ensure proper life-span and clean up, and the pointers to all the ownership structures can be globally walked using the ownership accounting tree. Moreover, a pointer to each ownership structure can be saved in the corresponding owner data structure. For example, Sort operator will maintain a pointer to its associated memory account. This way, Sort can quickly switch ownership without looking for its associated memory account in the memory accounting tree.

4. Design Details 4.1 Memory System

FIG. 1A shows an overview of a memory system that implements the memory manager system described. The memory system can include multiple nodes, similar to the node shown in FIG. 1A. In some implementations, each node includes one or more segments, corresponding to one or more virtual machines on the node. The memory system can include a master node and multiple worker nodes, where the master node and each worker node is implemented on a physical computer host or a virtual machine on a physical computer host. The master node can assign each worker node (or simply "node") to operate on a portion of the data stored in the memory system. Each node can include the node memory, and the node memory can be utilized by one or more queries, such as the queries (i) and (j) shown in FIG. 1A. Each query can involve one or more processes. As described, the processes required to execute the query can be determined based on the flow described, in which a parser parses the query and a planner plans the query and produces a query plan tree that includes owners corresponding to the processes needed to run the query.

Each process in a query includes a MM and a MUT. The MM, as described, may be a region-based memory manager or other memory manager that is capable of handling allocation and deallocation requests. The MUT tracks the memory allocation of the processes of the query, where each MUT associated with a query's process has a copy of the query plan tree or copy of a relevant portion of the query plan tree that defines the processes needed to perform the query.

Each of the MMs of the processes of the queries has access to the node memory (labeled "public memory" in FIG. 1A), to perform the allocation and deallocation operations. Additionally, the node memory includes a mechanism or channel by which the MUTs of different processes can communicate and can track the memory usage of other queries running on the node. In some cases, this communication mechanism or channel can be a shared memory region that enables the MUTs of the different processes of the different queries to communicate and to evaluate the memory usage status of the queries running on the node. This shared memory region can be an array of entries as shown in FIG. 1A, where each entry corresponds to a particular query and includes information relevant to the particular query. For example, each entry in the array of query details in the shared memory can include information relating to the status of the query, e.g., the query's start time, peak memory usage, current memory usage, query memory quota, the query's termination priority, e.g., the order in which the termination should be performed, and the number of worker processes executing the query. Additionally, each entry in the shared memory array can include information relating to the termination status of the query, if that is carried out. For example, the termination request can include data, e.g., a flag, indicating whether the query should terminate, a timestamp indicating when the determination to terminate the query was made, information to identify the termination requesting process, data indicating the free memory level of the node at the time of the termination request was made, data indicating how much of the node's memory was consumed by the terminating process before initiating the termination, and so on.

Each of the processes running on the node can access the communication mechanism, e.g., the shared memory, and in some implementations, can update information associated with one or more queries that is accessible via the communication mechanism. For instance, MUTs of various process can access one or more entries in the array of query details on the shared memory and can update the information for the one or more queries associated with those entries. For example, an MUT in a particular process of a query can update a "should terminate" field in an array entry relating to another query to indicate that the particular query should be terminated. In such an example, when a particular process associated with the particular query that should be terminated is executing, it can access the shared memory using its MUT and determine that the query to which it belongs should terminate. The process can then perform operations, for example, by communicating with a query plan dispatcher associated with the query, to inform the dispatcher and/or the other processes associated with that query that the query should terminate. The termination process for the query instructed to terminate may utilize other methods of determining that it should terminate and performing the termination procedure. It is worth noting, however, that the processes that determines the query should be terminated, and/or the query dispatcher, do not directly terminate the target query's processes, since that would prevent being able to cleanly exit a process, e.g., while the process is in a critical section.

Figure 8:
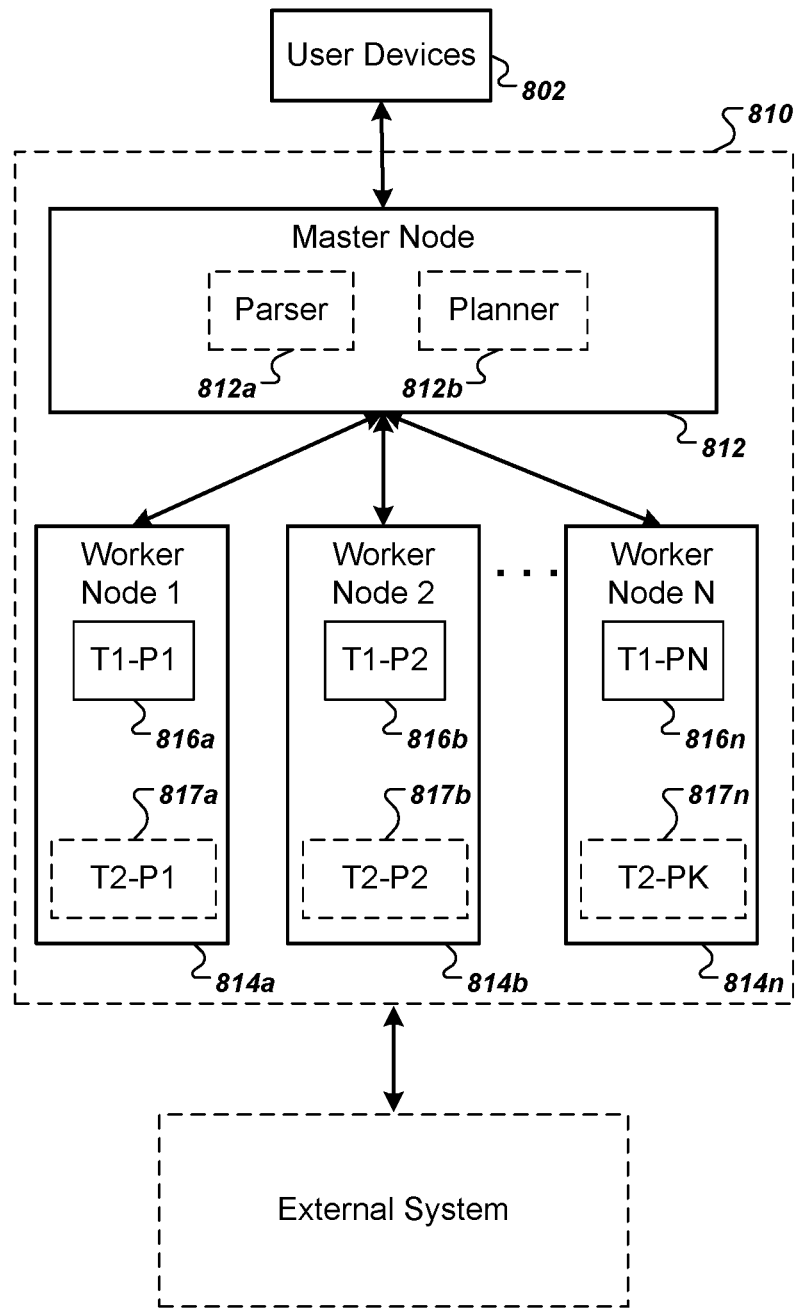
FIG. 8 depicts an example database management system.

The memory system shown in FIG. 1A forms the foundation for the memory manager system described herein, and whose operations are additionally described below. FIG. 8 provides a description of other functions of the memory system that uses the memory manager system.

4.2 Allocation Process

Figure 1B:
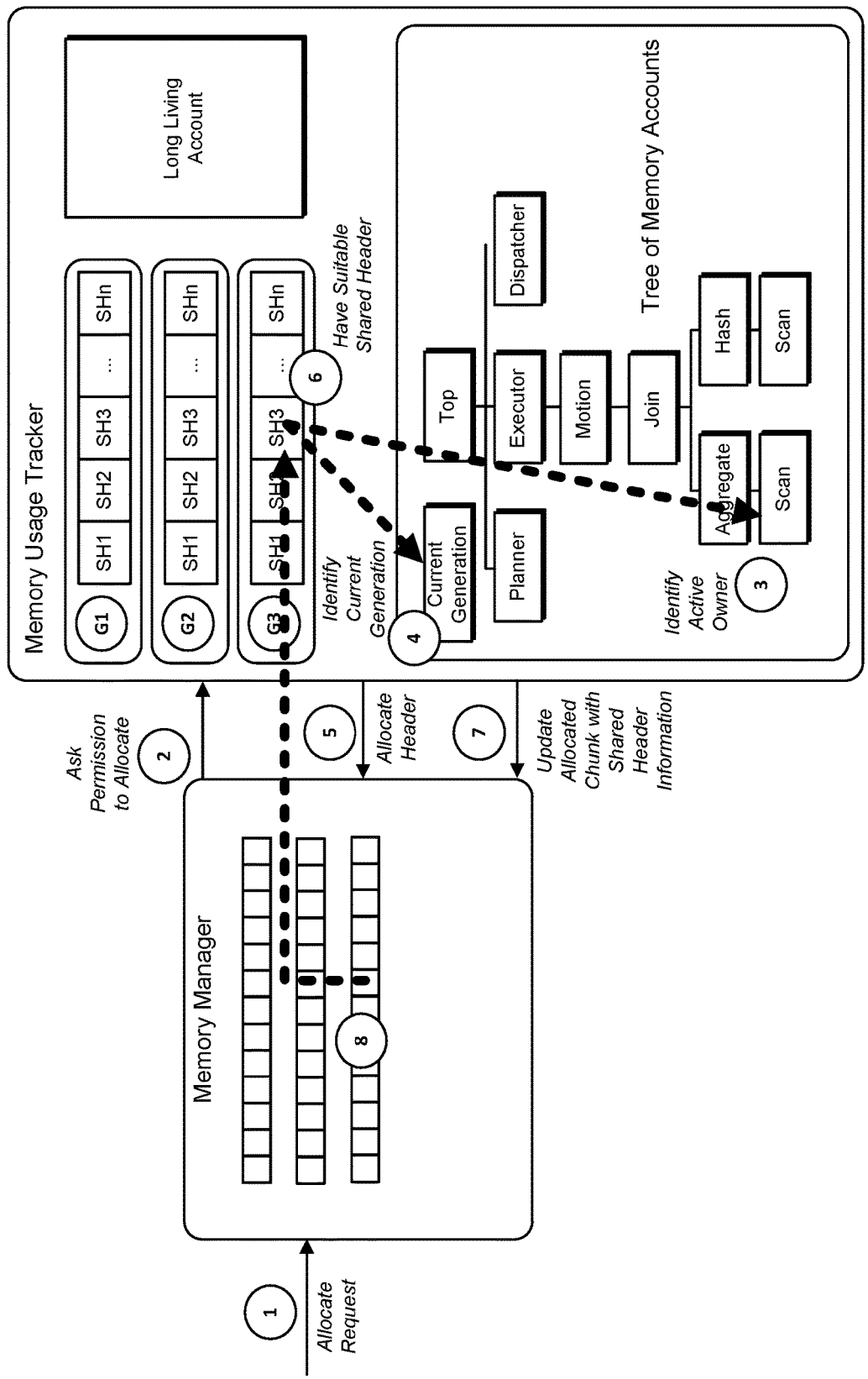
FIG. 1B is a diagram of an example memory usage tracker (MUT) in a multi-process computing system.

FIG. 1B shows a procedure for allocating memory for a process. For example, a process executed in connection with a query can request a new memory allocation. The memory allocation request can be provided by the component performing the process, e.g., the particular hardware or software component that requires the memory (e.g., the process). The memory allocation can be received at the MM associated with the process, as shown by step 1 in FIG. 1B.

When the MM receives the memory allocation request, the MM requests permission from the MUT to allocate the memory. This is indicated by step 2 of FIG. 1B. In order to determine whether the allocation can take place, the MUT first determines whether a mapping element, such as a shared header or other mapping device, e.g., a hash table, associated with the memory account and/or sub account of the active owner, i.e., process, exists.

A shared header or other mapping element includes the allocation information associated with a particular owner. Thus, the mapping element is associated with a particular memory account and/or sub-account. In the implementation shown in FIG. 1B, shared headers are maintained in shared header lists. Each shared header list is associated with a particular generation, where each generation corresponds to a query that is processed by the memory system. For example, the shared header lists in FIG. 1B are each associated with one of generation 1 ("G1"), generation 2 ("G2"), or generation 3 ("G3"). Each shared header list includes one or more shared headers, e.g., SH1 through SHn, where each shared header corresponds to a particular memory account and/or sub-account. In some implementations, the shared headers are maintained in two or three dimensional arrays, or another structure such as a hash table, where the shared headers can be stored according to generation, active memory region, memory account, and/or memory sub-account.

Thus, to determine whether a shared header or other mapping element exists for the active owner memory account and/or sub-account, the MUT determines the current active owner, e.g., the active owner in the query plan tree. This is indicated by step 3 of FIG. 1B. At step 4 of FIG. 1B, the MUT also determines the current generation. The current generation may be stored in the query plan tree, or may be other determined by the MUT. The MUT then determines whether a mapping element, such as a shared header, exists for the active owner by looking at the mapping, such as the shared header list of the identified generation, and attempting to locate the mapping element in the mapping, e.g., a shared header corresponding to the active owner in the generation's shared header list.

If an appropriate mapping element is not located, the MUT requests a mapping element allocation from the MM, as shown by step 5 of FIG. 1B. For example, the MUT can request that the MM allocate a new shared header. This allocation request is processed like any other allocation instruction by the MM, such that the MM can allocate the memory for the shared header or other mapping element and return the new shared header or mapping element to the MUT. The MUT can receive information identifying the new mapping element from the MM, and the MUT can then update the mapping element to include information pertinent to the mapping element, for example, a shared header can be initialized with information identifying the generation associated with the shared header, the owner, memory account, and/or sub-account associated with the shared header, the current memory region, and/or other information.

At step 6 of FIG. 1B, the MUT has located a mapping element for the active owner memory account and/or sub-account, either by locating the appropriate mapping element in the shared header lists, or by allocating the new mapping element as described.

Once the MUT has the mapping element for the active owner memory account and/or sub-account, the MUT can determine whether to grant permission for the MM to proceed with processing the allocation request received at step 1. If the MUT approves this request, the MUT sends information to the MM at step 7 that grants permission for the MM to process the allocation request, and also that provides the mapping information for the allocated chunks of memory with information about the mapping element. For example, the MUT can provide this information to the MM such that the MM updates the allocated memory chunk headers to include a pointer to the appropriate mapping element.

In doing so, the memory manager system can maintain a mapping of allocated memory chunks in, for example, in mapping elements, where each mapping element is associated with a particular owner memory account and/or sub-account. Such mapping provides for more precise tracking of memory usage, and also optimizes the system by allowing for faster freeing of the memory, since the memory can be freed by identifying proper mapping elements associated with the processes of a query, and freeing all of the chunks associated with those mapping elements without a need to walk each memory chunk.

As described with regards to step 7 of FIG. 1B, the MUT determines whether to approve the permission request provided by the MM to allocate memory. The procedure for evaluating the permission request provided by the MM is described in further detail at FIG. 2.

Figure 2:
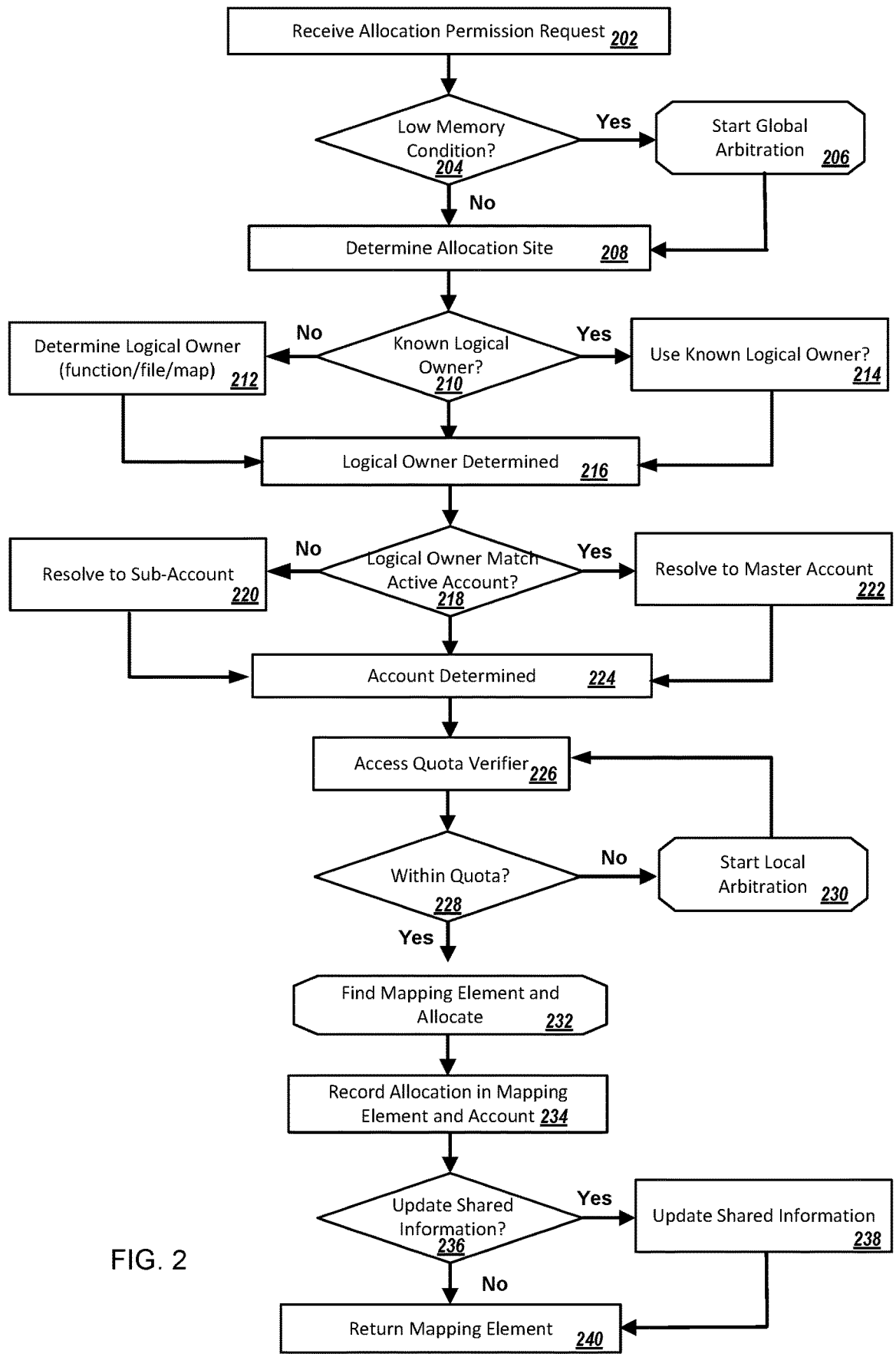
FIG. 2 is a flowchart for performing memory allocation in a multi-process computing system.

FIG. 2 illustrates the procedure for evaluating whether an allocation request should be processed. At step 202, the MUT receives the permission request from the MM, corresponding to step 2 of FIG. 1B. Upon receiving the permission request, the MUT first checks, at step 204, if a low-memory condition exists for the node. For example, the MUT can determine whether the memory usage is at a critical level, e.g., 80% of available node memory or higher, or if the node has encountered a true OOM event, in which the node memory has been exhausted. If the MUT determines that a low memory condition does exist, the MUT starts a global arbitration process at step 206. This global arbitration process is described in further detail in FIG. 3.

At step 208, the MUT determines the allocation site associated with the allocation request. For example, the MUT can access information that indicates the function, file, code region, etc., that is requesting the memory. Based on determining the allocation site associated with the allocation request, the MUT determines at step 210 whether the allocation site is associated with a known logical owner. That is, the MUT determines whether the particular function, file, or code region determined at step 208 is associated with a particular logical owner. As an example, if an allocation site is identified as being associated with a Sort process, the MUT can determine whether a logical owner for the Sort process already exists. If the MUT does identify a logical owner associated with the allocation site, the MUT recognizes that logical owner as shown at step 214. Otherwise, if the MUT does not identify a logical owner associated with the allocation site, the MUT uses a function map, file map, or other mapping to identify a logical owner associated with the allocation site at step 212. For example, a file "file.c" or a function "readFile" may belong to a file handling subsystem, and be assigned to that logical owner. At step 216, the MUT has determined the logical owner associated with the allocation site.

After the logical owner has been determined, the MUT then checks whether the identified logical owner matches the logical owner of the active owner at step 218. If the determined logical owner matches the logical owner of the active owner, the memory account associated with the active owner is identified as the account that the allocation request will be charged to, at step 222. Otherwise, the MUT determines a sub-account of the determined logical owner, and uses the determined sub-account of the logical owner as the account that the allocation request will be charged to, at step 220. Thus, at step 224, the MUT has identified the memory account and/or sub-account to which the allocation request will be billed, e.g., the identified account will have the allocation request, if processed, counted against its quota.

Upon determining the memory account and/or sub-account, the MUT starts a quota verifier at step 226 which determines at step 228 whether the identified account and/or sub-account is within the prescribed quota. If the account and/or sub-account is not within quota, or in some implementations, is close to exceeding its quota, the MUT can start a local arbitration process at step 230. This local arbitration process is described further at FIG. 4 and can determine whether memory in other processes in the query associated with the identified memory account and/or sub-account have quota to spare, such that this quota may be redistributed to the process associated with the identified account and/or sub-account. Upon performing the local arbitration process, the quota verifier can again be used to determine whether the account and/or sub-account is within quota (e.g., by returning to step 226).

Figure 5:
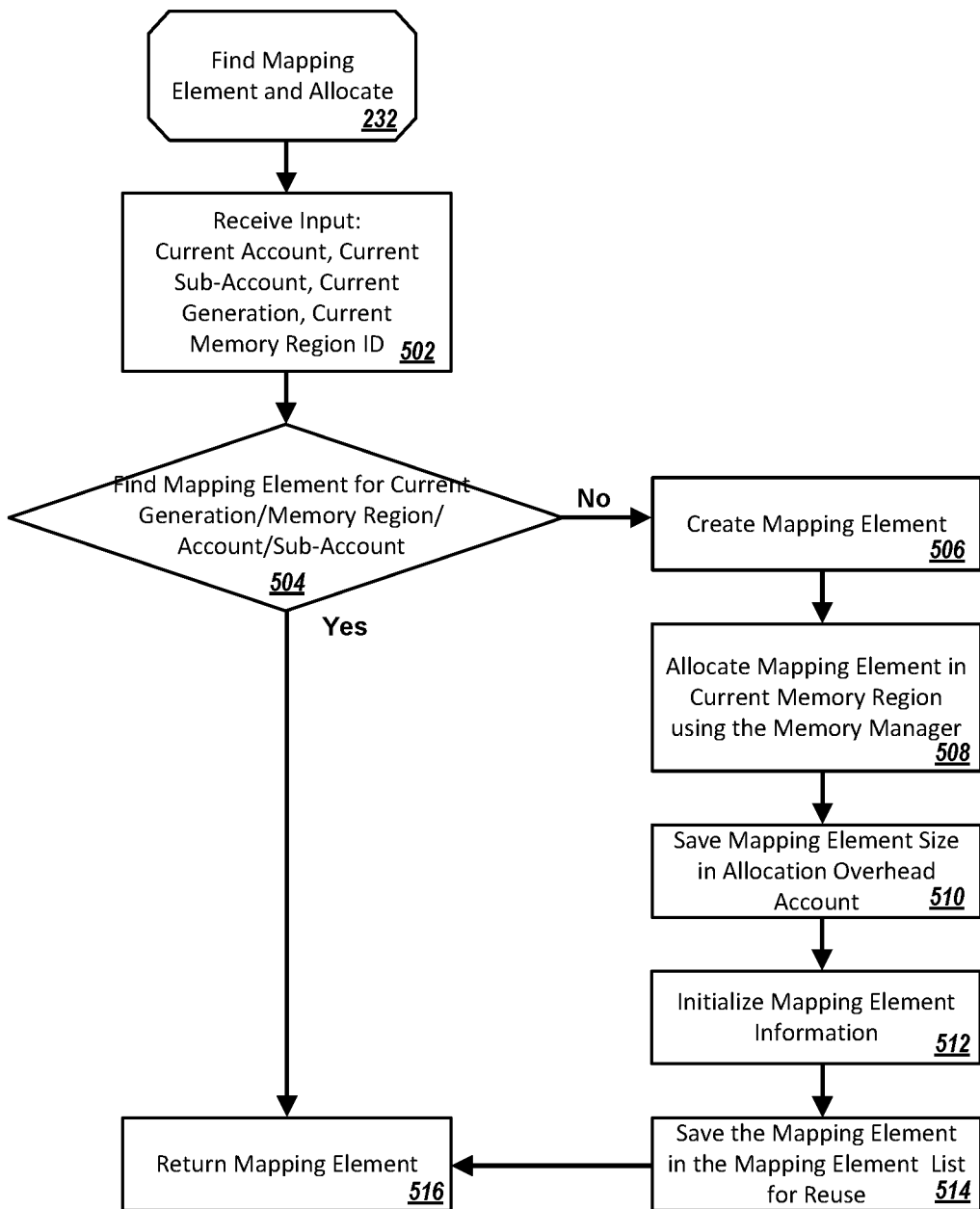
FIG. 5 is a flowchart for determining whether a shared header for an account and/or sub-account exists, and allocating a new shared header for an account and/or sub-account.

If the identified account or sub-account is within quota, the MUT executes a process, described at FIG. 5, to locate the mapping element, e.g., the shared header, associated with the account and/or sub-account and to allocate the requested memory. This is shown in FIG. 2 at step 232.

After the allocation is complete, the MUT performs accounting operations to record the allocation. At step 234, the MUT records the allocation in the account and/or sub-account, and also records the allocation in the mapping element, e.g., shared header. For example, the MUT can record the allocation in the account and/or sub-account by reducing the available memory quota indicated in the account and/or sub-account by the allocated memory amount. Additionally, the MUT can record the allocation in the account's and/or sub-account's mapping element by adding information to identify the allocated memory chunks or by adjusting a balance associated with the mapping element. At step 236, the MUT further determines whether to update the information associated with the shared memory (or information that is otherwise accessible to the processes of each query) to record the allocation, and possibly other previous allocations that have not been recorded. Since accessing the shared memory or other communication mechanism using the MUT is an expensive, memory-intensive process, in some implementations an allocation threshold may be set such that a MUT only updates the information when a threshold amount of memory, e.g., 1 MB, has been allocated and/or deallocated. Thus, the shared memory may not be updated with every allocation, e.g., when memory is allocated 1 KB at a time, but rather may be updated periodically when sufficient memory allocations have occurred, e.g., 1000 allocations and/or deallocations of 1 KB, for a total of 1 MB. If a determination is made to update the shared memory (or other information accessible via the communication mechanism), this is performed at step 238.

Regardless of whether this information is updated, the process of FIG. 2 concludes by returning the mapping element at step 240. For instance, the MUT may return the shared header associated with the account and/or sub-account to the MM such that the allocated memory chunk headers can be updated to identify the shared header, e.g., a pointer to the shared header may be added to the pointer of the allocated chunks.

5. Arbitration

FIG. 2 describes two types of arbitration that can be performed by the memory manager system: global and local arbitration. Global arbitration is performed to free node memory by terminating queries running on the node when the node encounters a low memory condition or OOM event. Local arbitration is performed to redistribute available quota amongst the processes of a query when a particular process has or nearly has exceeded its memory quota. As shown in FIG. 2, local arbitration is performed after global arbitration, since the allocation must first determine whether enough node memory is available for the allocation before proceeding to check the ability of a particular process to allocate any available memory.

5.1 Global Arbitration

Figure 3:
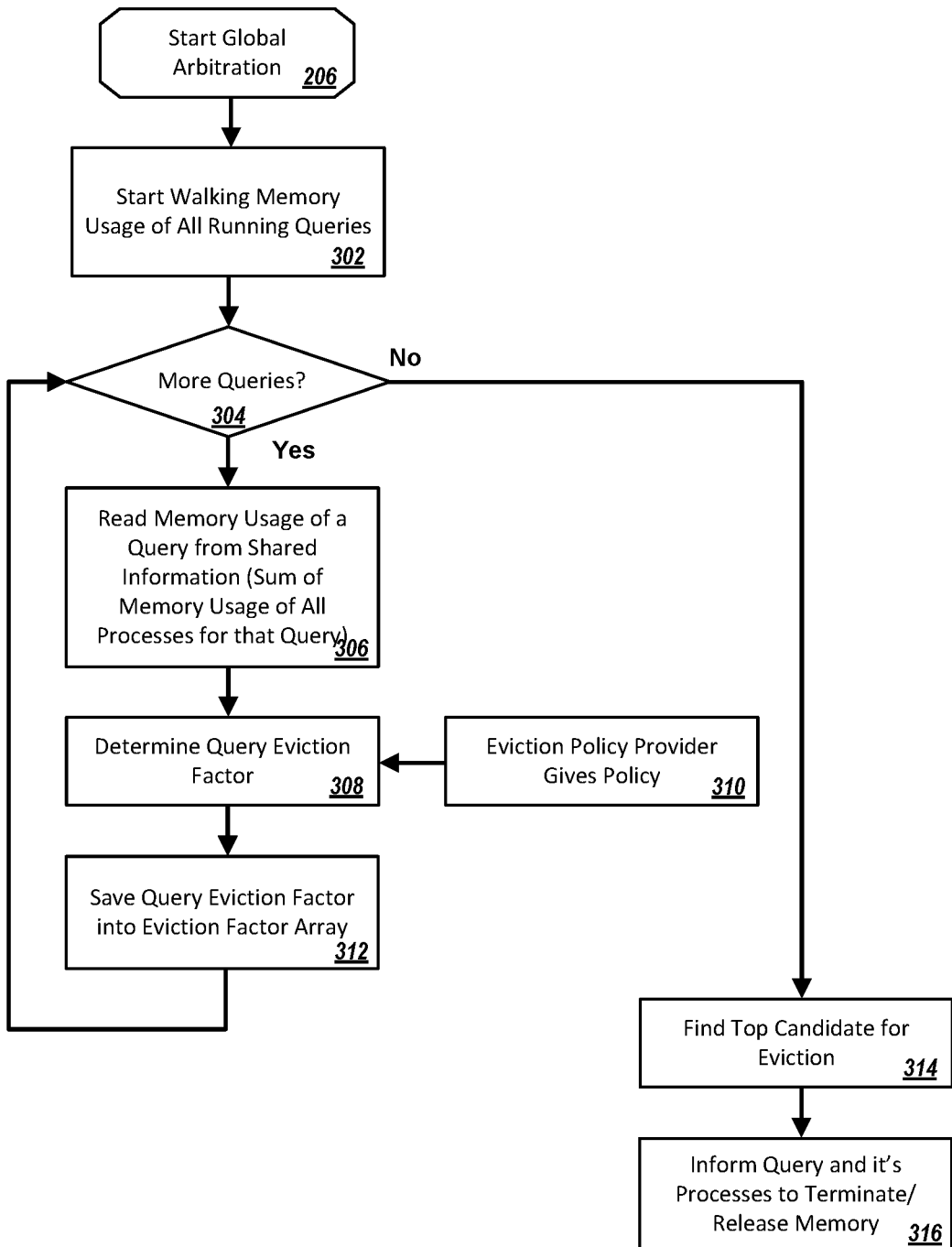
FIG. 3 is a flowchart for releasing allocated memory in a multi-process computing system.

Returning to step 206 to perform global arbitration of the procedure shown in FIG. 2, FIG. 3 illustrates the global arbitration process to a finer degree. The procedure of FIG. 3 starts with the step 206 corresponding to the starting of the global arbitration process in FIG. 2. The MUT can start walking the information associated with each of the queries running on the node, e.g., at the shared memory, query-by-query to determine the memory usage of the queries. As shown in FIG. 3, for example, at step 302 the MUT can access the shared memory and start to walk the array of entries corresponding to the queries. Alternatively, the MUT can request or instruct a designated process that walks the queries to walk the queries, and to return the memory usage of each query. Regardless, only one process' MUT or one designated walker process can walk the entries corresponding to the queries at a time. Since the MUT or other designated walker process walks through the entries query-by-query, at step 304 the MUT or designated process determines whether there are more entries, i.e., queries, identified in the query information, e.g., in the shared memory. If so, the MUT determines or receives at step 306 the memory usage for the next query. The MUT or designated walker process does this by reading the query status information in the query's entry, e.g., in the shared memory. For example, the "current memory" information shown in FIG. 1A can indicate the current memory usage of the query. The memory usage of the query is equivalent to the total memory usage of all of the processes associated with that query.

The MUT then determines a query eviction factor for the particular query. This eviction factor can be used to rank the queries running on the node to determine the order that the queries will be evicted, i.e., terminated, in the case of a low memory condition or OOM event. To determine the eviction factor for the particular query, the MUT can receive an eviction policy from an eviction policy provider at step 310. The eviction policy can be used to determine the eviction factor for the query based on the parameters set forth in the policy and the memory usage information associated with the query that is accessible by the MUT. For example, the eviction factor can be based on total memory usage of the query, the lifetime of the query (short-running or long-running), the percentage of the memory quota that the query is using, whether the query is identified as a critical query, or based on any number of other factors. After determining the eviction factor for the particular query, the MUT can save the eviction factor at step 312. For example, the eviction factor for the particular query can be saved in a separate eviction factor array, can be updated at the entry corresponding to the particular query in the shared memory, or can be otherwise documented. The procedure in FIG. 3 then repeats the process by determining if any other queries have not been evaluated to determine their eviction factors.

If all of the queries have been assessed, at step 314 the MUT determines the top candidate for eviction, e.g., the query that should be terminated first. The MUT then performs operations to inform the query that it should terminate itself. In some implementations, this is performed by setting the "should terminate" field in the entry in the shared memory corresponding to the query that is to be terminated to "true." A process of the query to be terminated can, at a later time, access the shared memory and determine based on the "should terminate" field that its query should be terminated. The process can then inform a query plan dispatcher associated with the query that its processes should be terminated, and the query can subsequently inform each of the processes of the query (in one or more nodes) to terminate. The all of the processes then self-terminate as they become aware that they are intended to terminate, thereby freeing their memory for further allocation.

5.2 Local Arbitration

Figure 4:
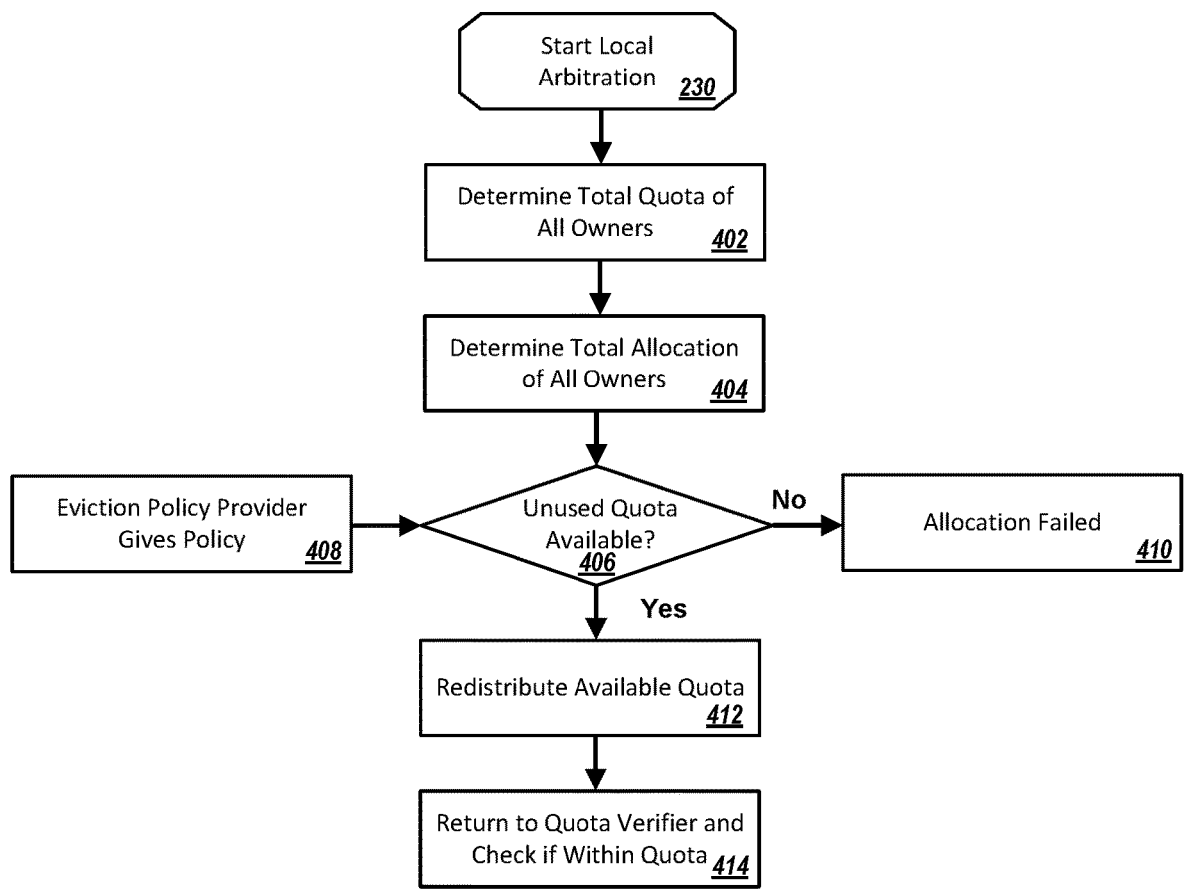
FIG. 4 is a flowchart for performing local memory arbitration in a multi-process computing system.

FIG. 4 shows the procedure for performing local arbitration, which determines if there is available memory quota within a particular query, and if so, redistributes the available quota as allowed. The quota redistributed may typically be the quota of one or more other owners in the same query as the process requesting the memory allocation. The procedure illustrated in FIG. 4 is performed based on determining that an account and/or sub-account that will be billed for a memory allocation is outside of its quota or is critically close to exceeding its quota. Starting with step 230 of FIG. 2, the procedure of FIG. 4 begins by initializing the local arbitration process.

At step 402, the MUT determines the total quota of all of the owners associated with the particular query. The MUT also determines at step 404 the total allocation of all of the owners, that is, the total amount of memory that has been allocated in association with each of the owners in the process. In some implementations, this is determined based on accessing the owner memory accounts and/or sub-accounts to determine the total memory allocated by each owner. The MUT aggregates the memory allocation of each owner to obtain the total memory allocation of the owners.

A decision is then made at step 406 as to whether any excess quota exists and is available for redistribution. For example, the MUT can determine if the total memory allocation of all of the owners is below the total memory quota of all of the owners. Furthermore, in some implementations, a local arbitration policy provider can provide, at step 408, a policy to the MUT, or the MUT can otherwise determine a policy, that governs how excess quota may be redistributed for particular owners. Based on the policy, the decision is made as to whether the excess quota can be redistributed to the memory account and/or sub-account that is outside of its quota. If excess quota does not exist, or if the policy prevents excess quota from being redistributed, then the allocation cannot occur and arrives at an allocation failure condition at step 410. However, if excess quota exists and can be redistributed, the quota can be redistributed to the account and/or sub-account that will be responsible for the requested memory allocation at step 412. In some instances, this is performed by updating the memory accounts and/or sub-accounts of one or more owners affected by the quota redistribution, to update their respective memory quotas. Quota may be redistributed to accounts and/or sub-accounts that are outside or critically close to exceeding their quotas in other ways as may be convenient for the application. At step 414, after the quota has been redistributed, the MUT returns to step 226 of FIG. 2 to check whether the account and/or sub-account is within quota, e.g., to proceed with the memory allocation.

5.3 Locating and Allocating Shared Headers

FIG. 5 shows a procedure for determining whether a shared header for an account and/or sub-account exists, and if the header does not exist, allocating a new shared header for the account and/or sub-account. The process of FIG. 5 corresponds to step 232 of FIG. 2. While described herein with respect to implementations that use shared headers to map memory chunks to specific owners, other methods that map memory to owners may utilize a similar process to locate and/or allocate memory for mapping elements or structures.

At step 502, the MUT has determined the current generation, current memory region (e.g., the current memory region ID), and the current memory account and/or sub-account. The MUT can determine this information, for example, at the steps 3 and 4 illustrated in FIG. 1B. Using this information, the MUT can determine at step 504 whether a shared header (or other mapping) exists for the current combination of the generation, memory region, account, and/or sub-account. For example, the MUT can attempt to identify the shared header corresponding to the current generation, memory region, account, and/or sub-account by accessing a hash table of shared headers, accessing a particular shared header list, looking up the particular shared header in a two or three-dimensional array of shared headers, etc. FIG. 1B, for example, shows shared headers stored in shared header lists that are distinguished by generation.

If a shared header corresponding to the identified generation, memory region, account, and/or sub-account is identified, the shared header is returned at step 516, and the allocation process can proceed. For example, memory chunks can be allocated by the MM, and the memory chunk headers updated to include a pointer to the returned shared header, while the shared header can be updated to identify the allocated memory chunks.

If a shared header corresponding to the identified generation, memory region, account, and/or sub-account is not identified, the procedure proceeds to step 506, where a new shared header is created. For example, a new shared header can be created in the proper location in a shared header hash table, list, or array. Other mapping elements can be created to record the mapping of allocated memory to owner. At step 508, memory for the shared header can be allocated by the MM. For instance, the MUT can request that the MM allocate memory in the currently active memory region for the newly created shared header, e.g., as in step 5 of FIG. 1B. Once the newly created shared header has been allocated, the allocation overhead account that tracks the aggregate memory usage of all of the shared headers and/or chunk headers can be updated to reflect the memory allocated for the new shared header (step 510). The MUT can also initialize the newly created shared header at step 512 to include information relevant to the shared header and/or its related account and/or sub-account. For example, the shared header can be initialized to include information identifying the current generation, current memory region, and the account and/or sub-account associated with the shared header. The initialized shared header is saved for later reuse by the account and/or sub-account at step 514, when the shared header is then returned, as described above. While described here with respect to shared headers, other mapping elements may similarly be initialized, documented in an allocation overhead account, and saved for reuse.

6. Freeing Memory

6.1 Freeing a Single Allocation

Figure 6:
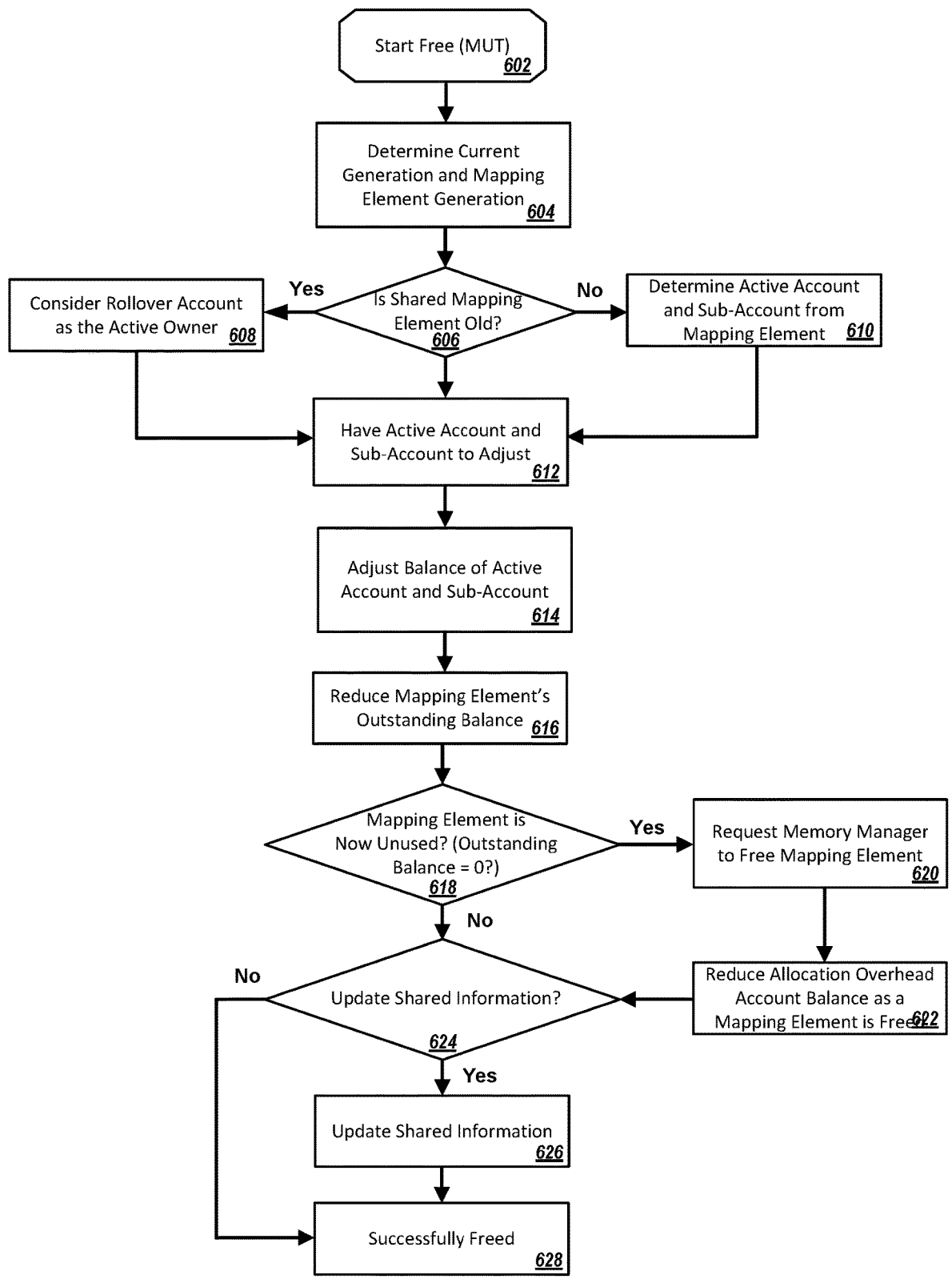
FIG. 6 is a flowchart for freeing a memory chunk in a multi-process computing system.

FIG. 6 describes a process for freeing a memory chunk memory associated with a memory account and/or sub-account, as well as the shared header associated with the freed memory account and/or sub-account. The procedure of FIG. 6 begins by determining the current generation as well as determining the generation of the shared header who's associated memory is being freed. The current generation may be determined, for example, using a process similar to the process described at step 4 of FIG. 1B. The generation of the mapping element, e.g., shared header, can be determined by accessing the information in the mapping element. For example, the generation of a shared header can be determined using the information added to the shared header during the initialization process described at step 512 of FIG. 5. Once the current generation and mapping element's generation have been determined, the MUT determines whether the mapping element's generation precedes the current generation, e.g., if the shared header's generation is old, at step 606. If the mapping element's generation is old, the MUT treats the long-living rollover account as the owner of the memory chunk to be freed, as shown at step 608. If, however, the current generation and the mapping element's generation match, then the MUT considers the owner associated with the mapping element as the owner of the chunk, e.g., the account and/or sub-account associated with the shared header. This is shown at step 610 of FIG. 6. Based on the decision and subsequent determinations made at steps 606-610, the MUT at step 612 has determined the proper memory account and/or sub-account to adjust based on the memory freeing.

The MUT then adjusts the balance of the determined memory account and/or sub-account and the balance of the mapping element by the freed memory amount at steps 614 and 616. At step 618, the MUT determines whether the mapping element's balance, e.g., the shared header's balance, has been reduced to zero, i.e., if all of the memory associated with the mapping element's account and/or sub-account has been freed. If the balance has been reduced to zero, there is no longer any memory allocated for the mapping element's associated account and/or sub-account, and the MUT can therefore instruct the MM to free the mapping element memory at step 620. Based on the mapping element, e.g., the shared header, being freed, the overhead account balance can be updated at step 622 to reduce the overhead account balance by an amount equal to the freed mapping element's memory usage.

Regardless of whether the mapping element is freed, at step 624 a determination is made whether to update the information accessible by the processes on the node, e.g., the shared memory, to reflect the freed memory, e.g., to update the shared memory to indicate that an amount of memory equal to the freed memory amount since the last shared memory update is now available. As described, this determination can be based upon a threshold allocation or deallocation threshold amount, to prevent unnecessary access and updating of this information, which is an expensive resource to access and/or update. If the conditions for updating the information accessible by all of the processes on the node are met, then the shared memory is updated at step 626 to reflect the allocations and/or deallocations since the last update, including the memory deallocation associated with the memory freeing. The MUT can then return information at step 628 indicating that the free process has been successfully completed.

6.2 Bulk Free

Figure 7:
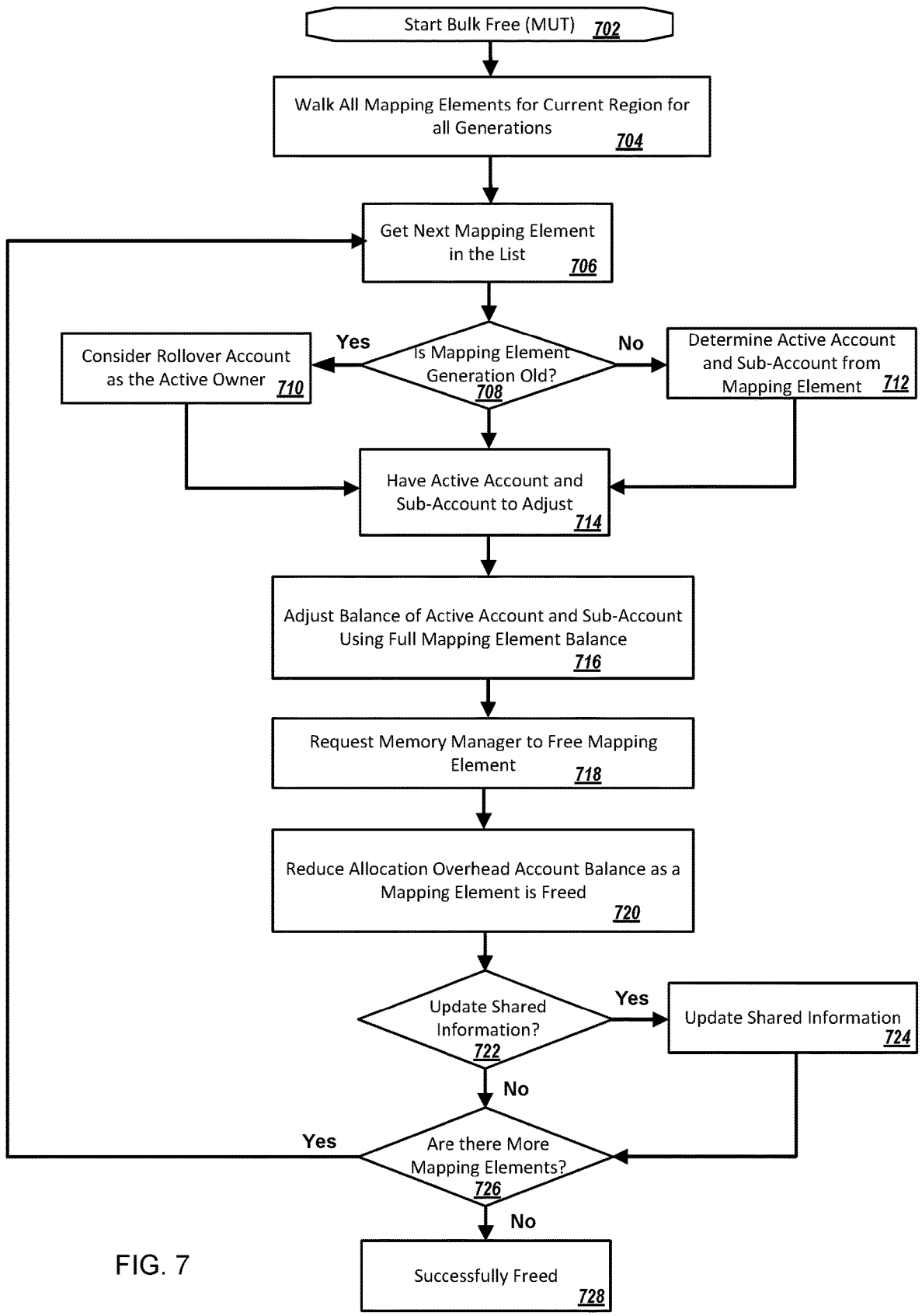
FIG. 7 is a flowchart for performing a bulk freeing of memory in a multi-process computing system.

FIG. 7 describes a process for performing a bulk freeing operation that frees all memory on a particular region of memory in a single procedure. During the free operation of an entire memory region, MUT must adjust the balance of the corresponding owner for every chunk that is being freed. The MUT optimizes this adjustment by exposing a bulk free API that can walk the list of shared headers associated with a memory region to quickly adjust the balance of all the owners' who allocated memory in that memory region. This ensures that the balance adjustment of many owners happen quickly without having to walk each chunk of memory in a region.

The procedure of FIG. 7 starts by initializing the bulk free process at step 702 and beginning to walk each of the mapping elements, e.g., the shared headers, in the memory region being freed, regardless of the generation of the mapping elements. For example, the shared headers for the memory region can have multiple associated generations, and the MUT or a dedicated walker process can walk each of these shared headers. This procedure is shown at steps 704 and 706 of FIG. 7. At step 708, the generation of the current mapping element that the MUT is analyzing, i.e., in the walkthrough, is compared to the current generation. This is similar to the process described with respect to step 606 of FIG. 6. Similar to the MUT Free procedure, if the generation of the mapping element being evaluated is older than the current generation, the rollover account is considered to be the owner memory account associated with the memory freeing at step 710. If the generation of the mapping element being evaluated matches the current generation, then at step 712 the account and/or sub-account associated with the mapping element is determined. Thus, at step 714, the MUT has identified the account and/or sub-account that the memory freeing will be associated with.

Upon identifying the account and/or sub-account, the MUT then adjusts the balance of the account and/or sub-account by the full balance indicated by the mapping element. For example, the balance of the account and/or sub-account can be adjusted by the balance indicated by an appropriate shared header. Since all of the chunks on a particular region of memory are being freed, and since the mapping elements, e.g., shared headers are specific to the particular memory region, generation, and account and/or sub-account, the full balance of the mapping element can be deducted from the memory balance of the account and/or sub-account that was identified at step 714. This deduction occurs at step 716 of FIG. 7. Thereafter, since the mapping element's balance has been effectively reduced to 0, the MUT can request that the MM free the shared header at step 718. In addition to requesting that the mapping element's memory be freed, the MUT can also reduce the allocation overhead account balance at step 720 to reflect the freeing of the mapping element's memory. As described, the allocation overhead account balance can be reduced by an amount equal to the mapping element's, e.g., the shared header's, memory usage. Similar to the process described at steps 624 and 626 of FIG. 6, the MUT can then determine at step 722 whether to update the information accessible by all of the processes on the node, e.g., the shared memory, to reflect the freeing of the mapping element and/or the freed memory chunks that were previously associated with the freed mapping element. If so, the MUT updates the information, e.g., the shared memory, at step 724.

Step 726 then determines whether there are remaining mapping elements, e.g., other shared headers, in the particular memory region that have not been freed, and if there are, returns to step 706 to repeat the relevant portion of the procedure of FIG. 7. If all of the mapping elements of the memory region, regardless of generation, and account and/or sub-account, have been freed, then all of the memory chunks of the region have also been freed, and the process can end at step 728 by returning an indication that the bulk free procedure was successful.

7. Memory System

FIG. 8 is a diagram of an example system 810. The system 810 illustrates a database management system 810 on which the innovative technologies described in this specification can be implemented.

In the system 810, data is distributed data across multiple storage devices. The nodes 814a through 814n, which may be referred to as worker nodes when necessary to distinguish them from the master node, can access the data by communicating with underlying storage systems, which can be, for example, a Hadoop File System (HDFS). The data can be replicated, i.e., identical copies of the data can be stored on multiple storage devices, or partitioned, i.e., different portions of the data can be stored on multiple storage devices. For example, the data portions can be table partitions of a massively parallel processing (MPP) database.

The system 810 includes a master node 812 and multiple worker nodes 814a, 814b, through 814n. The master node 812 and each worker node 814a-n is implemented a physical computer host or a virtual machine on a physical computer host. The master node 812 assigns each worker node to operate on a portion of data stored in the first system 810.

For example, as illustrated, the system 810 includes a first worker node 814a assigned to operate on a first partition 816a of a first database table. Similarly, a second worker node 814b is assigned to operate on a second partition 816b of the first database table. The system 810 can include an arbitrary number N of worker nodes, up to the worker node 814n that is assigned to operate on an Nth partition of 816n of the first database table.

Multiple user devices can access the system 810. A user of a user device 802 can access data stored in the system 810 by communicating with the master node 812. The master node 812 coordinates with the worker nodes 814a-814n to respond to requests for data from the user device 802. The user device 802 can issue a query, e.g. in structured query language (SQL) or object query language (OQL), to the master node 812. The master node 812 communicates with the worker nodes 814a-814n to obtain data that satisfies the query. The master node 812 can maintain a system catalog that provides a mapping between data portions and worker nodes that are assigned to operate on the data portions. The system 810 can access data stored on other external systems.

When the master node 812 receives a query, the master node 812 parses the query and generates a query plan. The query plan defines the operations that the master node 812 will distribute to the worker nodes to fulfill the query. The master node 812 may access a system catalog and perform cost estimations and optimization algorithms to determine a query plan that reduces the cost, e.g. processing time and network bandwidth required, of fulfilling the query. Functionality of the master node 812 may be implemented by multiple software modules performing different functions, for example, a query parser 812a and a query planner 812b.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising:
a distributed database management system (DBMS) comprising a plurality of computers and one or more storage devices storing instructions that are operable, when executed by the plurality of computers, to cause the plurality of computers to implement a plurality of nodes, each node being configured to perform operations comprising:
executing a plurality of processes belonging to a plurality of different queries executed by the distributed DBMS, wherein each process comprises one or more operator instances, and wherein each process has an instance of a memory usage tracker that is configured to approve or reject requests for memory made by the one or more operators instances;
receiving, by a first memory usage tracker of a first process executing on the node and from a first operator instance, a request to allocate a chunk of memory on the node to the first operator instance, the first operator instance being an operator instance in the first process;
determining that an aggregate memory usage of the plurality of processes executing on the node does not exceed an aggregate memory quota for the node;
determining that a memory usage of the first process exceeds a memory quota for the first process; and
in response, rejecting the request to allocate the chunk of memory on the node to the first operator instance.

2. The system of claim 1, wherein the operations further comprise:
reallocating memory quota, to the first process, from one or more of the plurality of processes executing on the node other than the first process according to a reallocation policy; and
in response, allocating memory to the first operator instance.

3. The system of claim 2, wherein reallocating memory quota comprises updating a memory account of the one or more processes other than the first process and the first process.

4. The system of claim 2, wherein the reallocation policy specifies reallocating memory quota only from processes that have an amount of excess memory quota that exceeds a threshold.

5. The system of claim 1, wherein determining that an aggregate memory usage of the plurality of processes executing on the node does not exceed an aggregate memory quota for the node comprises:
accessing a memory account of each of the plurality of processes executing on the node, including obtaining a memory usage and a memory quota of each process;
aggregating the memory usage of each process together and aggregating the memory quota of each process together; and
comparing the aggregate memory usage to the aggregate memory quota.

6. The system of claim 1, wherein each operator instance is one of a plurality of operator types, and wherein each memory usage tracker is further configured to track memory usage for each operator type by, for each operator instance, performing operations comprising:
receiving a first call that indicates a beginning of a region of code for the operator instance, the operator instance being a particular operator type,
recording memory allocations and deallocations caused by execution of the region of code in a memory account for the particular operator type, and
receiving a second call that indicates an end of the region of code for the operator instance, wherein the second call causes the memory usage tracker to stop recording memory allocations and deallocations in the memory account for the particular memory type.

7. A method performed by each of a plurality of nodes of a distributed database management system (DBMS), the method comprising:
executing a plurality of processes belonging to a plurality of different queries executed by the distributed DBMS, wherein each process comprises one or more operator instances, and wherein each process has an instance of a memory usage tracker that is configured to approve or reject requests for memory made by the one or more operators instances;

receiving, by a first memory usage tracker of a first process executing on the node and from a first operator instance, a request to allocate a chunk of memory on the node to the first operator instance, the first operator instance being an operator instance in the first process;

determining that an aggregate memory usage of the plurality of processes executing on the node does not exceed an aggregate memory quota for the node;

determining that a memory usage of the first process exceeds a memory quota for the first process; and in response, rejecting the request to allocate the chunk of memory on the node to the first operator instance.

8. The method of claim 7, further comprising:

reallocating memory quota, to the first process, from one or more of the plurality of processes executing on the node other than the first process according to a reallocation policy; and in response, allocating memory to the first operator instance.

9. The method of claim 8, wherein reallocating memory quota comprises updating a memory account of the one or more processes other than the first process and the first process.

10. The method of claim 8, wherein the reallocation policy specifies reallocating memory quota only from processes that have an amount of excess memory quota that exceeds a threshold.

11. The method of claim 7, wherein determining that an aggregate memory usage of the plurality of processes executing on the node does not exceed an aggregate memory quota for the node comprises:

accessing a memory account of each of the plurality of processes executing on the node, including obtaining a memory usage and a memory quota of each process;

aggregating the memory usage of each process together and aggregating the memory quota of each process together; and comparing the aggregate memory usage to the aggregate memory quota.

12. The method of claim 7, wherein each operator instance is one of a plurality of operator types, and wherein each memory usage tracker is further configured to track memory usage for each operator type by, for each operator instance:

receiving a first call that indicates a beginning of a region of code for the operator instance, the operator instance being a particular operator type;

recording memory allocations and deallocations caused by execution of the region of code in a memory account for the particular operator type; and receiving a second call that indicates an end of the region of code for the operator instance, wherein the second call causes the memory usage tracker to stop recording memory allocations and deallocations in the memory account for the particular memory type.

13. One or more non-transitory computer storage media storing instructions that are operable, when executed by one or more computers, to cause the one or more computers to implement a plurality of nodes of a distributed database management system (DBMS), each node being configured to perform operations comprising:

executing a plurality of processes belonging to a plurality of different queries executed by the distributed DBMS, wherein each process comprises one or more operator instances, and wherein each process has an instance of a memory usage tracker that is configured to approve or reject requests for memory made by the one or more operators instances;

receiving, by a first memory usage tracker of a first process executing on the node and from a first operator instance, a request to allocate a chunk of memory on the node to the first operator instance, the first operator instance being an operator instance in the first process;

determining that an aggregate memory usage of the plurality of processes executing on the node does not exceed an aggregate memory quota for the node;

determining that a memory usage of the first process exceeds a memory quota for the first process; and in response, rejecting the request to allocate the chunk of memory on the node to the first operator instance.

14. The one or more non-transitory computer storage media of claim 13, wherein the operations further comprise:

reallocating memory quota, to the first process, from one or more of the plurality of processes executing on the node other than the first process according to a reallocation policy; and in response, allocating memory to the first operator instance.

15. The one or more non-transitory computer storage media of claim 14, wherein reallocating memory quota comprises updating a memory account of the one or more processes other than the first process and the first process.

16. The one or more non-transitory computer storage media of claim 14, wherein the reallocation policy specifies reallocating memory quota only from processes that have an amount of excess memory quota that exceeds a threshold.

17. The one or more non-transitory computer storage media of claim 13, wherein determining that an aggregate memory usage of the plurality of processes executing on the node does not exceed an aggregate memory quota for the node comprises:

accessing a memory account of each of the plurality of processes executing on the node, including obtaining a memory usage and a memory quota of each process;

aggregating the memory usage of each process together and aggregating the memory quota of each process together; and comparing the aggregate memory usage to the aggregate memory quota.

18. The one or more non-transitory computer storage media of claim 13, wherein each operator instance is one of a plurality of operator types, and wherein each memory usage tracker is further configured to track memory usage for each operator type by, for each operator instance, performing operations comprising:

receiving a first call that indicates a beginning of a region of code for the operator instance, the operator instance being a particular operator type, recording memory allocations and deallocations caused by execution of the region of code in a memory account for the particular operator type, and receiving a second call that indicates an end of the region of code for the operator instance, wherein the second call causes the memory usage tracker to stop recording memory allocations and deallocations in the memory account for the particular memory type.

* * * * *